United States Patent
Bluzer

(10) Patent No.: US 6,489,615 B2
(45) Date of Patent: Dec. 3, 2002

(54) ULTRA SENSITIVE SILICON SENSOR

(75) Inventor: Nathan Bluzer, Rockville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 18 days.

(21) Appl. No.: 09/738,058

(22) Filed: Dec. 15, 2000

(65) Prior Publication Data

US 2002/0117622 A1 Aug. 29, 2002

(51) Int. Cl.[7] .................................................. G01J 5/00
(52) U.S. Cl. ................................................... 250/338.1
(58) Field of Search .......................... 250/338.1, 338.4, 250/352

(56) References Cited

U.S. PATENT DOCUMENTS

| | | | | |
|---|---|---|---|---|
| 4,781,065 A | * | 11/1988 | Cole ........................... | 73/198 |
| 5,523,564 A | * | 6/1996 | Yamada et al. ........... | 250/338.1 |
| 5,589,689 A | * | 12/1996 | Koskinen ................. | 250/339.01 |
| 5,811,815 A | * | 9/1998 | Marshall et al. ........ | 250/370.06 |
| 6,133,572 A | * | 10/2000 | Cunningham .......... | 250/339.03 |
| 6,242,740 B1 | * | 6/2001 | Luukanen et al. ......... | 250/353 |

* cited by examiner

*Primary Examiner*—Constantine Hannaher
*Assistant Examiner*—Shun Lee

(57) ABSTRACT

Electro-thermal feedback is utilized for removing thermal conductance between a bolometer's absorber element of a pixel in a thermal radiation sensor assembly and the environments through its mechanical support structure and electrical interconnects, thereby limiting the thermal conductance primarily through photon radiation. Zeroing the thermal conductance associated with the mechanical support structure and electrical interconnects is achieved by electro-thermal feedback that adjust the temperature of an intermediate stage of the mechanical support structure and electrical interconnects to equal the bolometer's absorber element temperature.

37 Claims, 8 Drawing Sheets

TEMPERATURE DIFFERENCE SENSING

BAND DIAGRAM OF DIODE $D_2, 40$
AT TEMPERATURE $T_2 < T_1$

BAND DIAGRAM OF DIODE $D_1, 34$
AT TEMPERATURE $T_1 < T_2$ $$\delta(\Delta\Phi_1(T_1))/\delta T_1 = \delta(\Delta\Phi_2(T_2))/\delta T_2 = -2 \text{ mV/K}$$

ULTRA SENSITIVE SILICON SENSOR

BACKGROUND OF THE INVENTION

1. Field of the Invention

This invention relates generally to radiation sensors and more particularly to bolometer type sensors for detecting thermal radiation.

2. Description of Related Art

Bolometers are used and proposed for use in many new applications. The principal application is construction of thermal cameras. Interest in bolometers stems from the fact that their performance has significantly improved, they're sensitive at much longer wavelengths, and operate at room temperature. Specifically, IR cameras, with large bolometer arrays have achieved a sensitivity, a Noise Equivalent Temperature resolution (NE$\Delta$T) better than ≈0.05K. Such performance is less than that of quantum detectors; however, for many applications it is adequate and cost effective. Improved bolometer performance is achieved primarily through improved thermal isolation, made possible with advances in IC micro-machining technology. The thermal isolation achieved is about an order of magnitude from radiation limited isolation.

Bolometers inherently operate at slower rates than quantum detectors. However, with staring focal plane arrays, the slow speed limitation is alleviated, since the pixel integration times correspond to the frame rate, and is much longer than line times in scanning systems. Thus the main obstacle to making bolometers more sensitive are practical limitations in thermally isolating each pixel element. With improved thermal isolation, the bolometers performance will directly improve and thereby find wider applications, including potential replacement for cryogenic FLIR cameras. With ideal thermal isolation, the anticipated NE$\Delta$T improvement is about an order of magnitude in sensitivity.

SUMMARY

Accordingly it is an object of the present invention to provide an improvement in the sensitivity of electromagnetic radiation sensors.

It is a further object of the invention to provide an improvement in sensors for detecting thermal radiation.

It is yet another object of the invention to provide an improvement in bolometers for detecting thermal radiation with increased sensitivity.

And it is yet a further object of the invention to provide a bolometer structure fabricated in silicon which operates in an improved mode for increased sensitivity.

These and other objects are achieved by elecro-thermal feedback for removing thermal conductance between a bolometer pixel and the environment through its mechanical support structure and electrical interconnects, thereby limiting the thermal conductance primarily through photon radiation. Zeroing the thermal conductance associated with the mechanical support structure and electrical interconnects is achieved by electro-thermal feedback that adjusts the temperature of the intermediate stage, and the mechanical support structure, and electrical interconnects to equal the bolometer's absorber element temperature.

Further scope of applicability of the present invention will become apparent from the detailed description provided hereinafter. It should be understood, however, the detailed description and the specific examples, while indicating the preferred embodiments of the invention are made by way of illustration only, since various changes and modifications coming within the spirit and scope of the invention will become apparent to those skilled in the art from the detailed description.

One aspect of the invention is directed to a thermal radiation sensor assembly, comprising: means for providing a heat bath for the assembly; an absorber element for detecting thermal radiation; an intermediate stage for thermally isolating the absorber element from the means for providing a heat bath and including a thermal isolation member having a predetermined thermal conductance, interconnecting the absorber element to the intermediate stage; and an electro-thermal feedback circuit located within the intermediate stage for reducing the thermal conductivity between the absorber element and the means providing a heat bath by causing the temperature of the intermediate stage to converge to the temperature of the absorber element when detecting thermal radiation, effectively causing the thermal conductance of the thermal isolation member to attain a minimum conductance value and thereby improve the sensitivity of the absorber element to the thermal radiation limit. A plurality of these sensors, moreover, are intended for use in an array.

Another aspect of the invention is directed to a method of sensing thermal radiation, comprising the steps of: locating an absorber element above a heat bath member; interconnecting the absorber element and the heat bath member by a thermal isolation member having a predetermined thermal conductance; and, reducing the thermal conductivity between the absorber element and the heat bath member by causing the temperature of the intermediate stage to converge to the temperature of the absorber element when detecting thermal radiation, effectively causing the thermal conductance of the thermal isolation member to attain a minimum conductance value and thereby improve the sensitivity of the absorber element to the thermal radiation limit.

BRIEF DESCRIPTION OF THE DRAWINGS

The present invention will become more fully understood when considered in conjunction with the accompanying drawings which are provided by way of illustration only and are thus not meant to be considered in a limiting sense, and wherein.

DETAILED DESCRIPTION OF THE INVENTION

Conventional Bolometers

Figure 1:
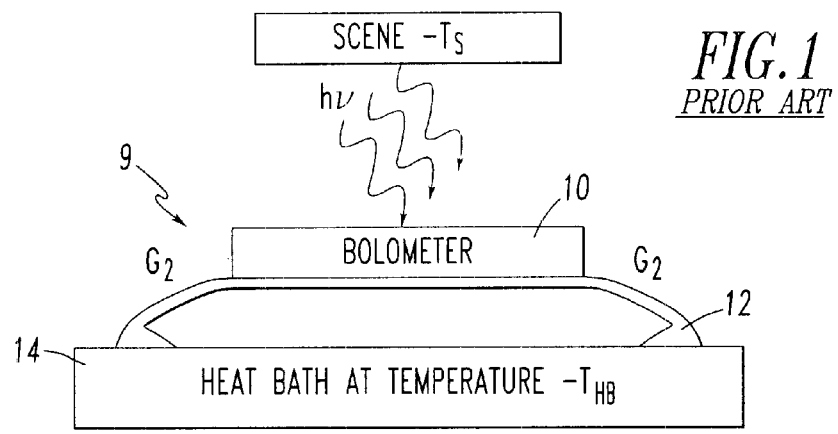
FIG. 1 is a diagram illustrative of a conventional bolometer which is attached to a thermal isolation bridge sitting on top of a substrate including a heat bath.
Figure 2:
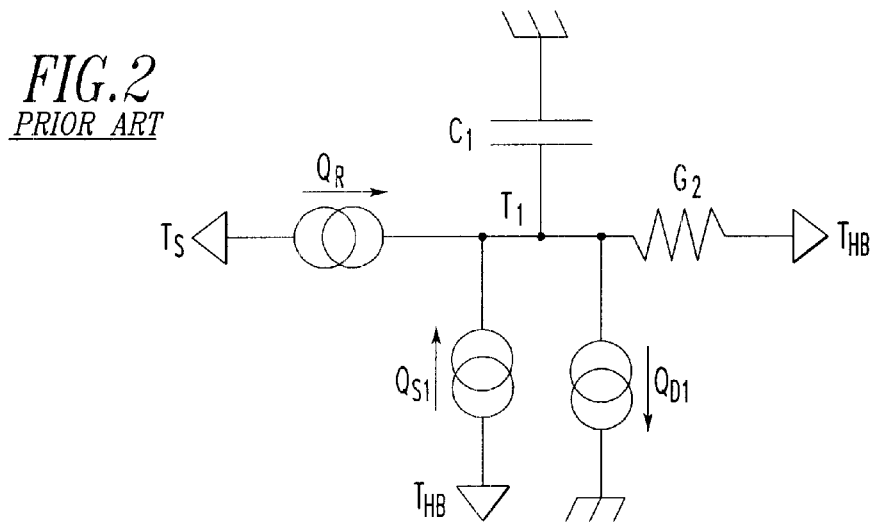
FIG. 2 is a thermal equivalent circuit for the bolometer shown in FIG. 1.

A bolometer is made up of single bolometer pixels assembled into an x-y array with associated readout circuits. A conventional bolometer pixel, and its thermal equivalent circuit, are shown in FIGS. 1 and 2 by reference numeral 9. The bolometer pixel 9, as shown in FIG. 1, includes an absorber element, represented by a rectangle 10 with area $A_D$, that is mechanically supported by a low thermal conductance bridge 12, which sits atop of a substrate which labeled as a thermal bath 14, at temperature $T_{HB}$. Photons hv incident on the bolometer pixel 9 having an absorber element are absorbed and change the pixel temperature by $\delta T_1$, from $T_1$. As shown in FIG. 2, the absorber elements heat capacity is $C_1$ and the thermal conductance to the bridge 12 is $G_2$. The scene, at temperature $T_S$, is radiating photons hv at the absorber element 10 and this is represented as thermal current $Q_R$. The absorber element 10, in addition to being mechanically attached to the heat bath by the bridge's thermal conductance $G_2$, is radiating $Q_{D1}$ and receiving $Q_{S1}$, from the shields, not shown.

For analysis, we represent the thermal conductance between the heat bath at $T_{HB}$ and absorber element at $T_1$ as a thermal resistance with a conductance $G_2$. The absorber element's heat capacity is represented by capacitor $C_1$. The temperatures $T_S$, $T_1$, $T_{HB}$ are treated as voltages. With such an equivalent model, the bolometer's pixel (FIG. 1) performance can be analyzed with the well developed techniques used for electronic circuits as follows.

Signal Level in Conventional Bolometers

The detector's signal is dependent on the absorbed incident photon flux power, and this is given by $Q_R = \sigma T_S^4 A_D / 4F^2$, where $\sigma = 5.6697 \times 10^{-8}$ W—m$^{-2}$—K$^{-4}$, $T_S$ is the scene temperature, and F is the optic's F#. Additionally, photon flux power is incident onto the detector from the shields, and it is given by $Q_{S1} = \sigma T_{HB}^4 A_D [1 - 1/4F^2]$. Similarly, the bolometer radiates photon flux power to the environment, and this is given by $Q_{D1} = \sigma T_D^4 A_D$. Functional differences between the expression for $Q_R$, $Q_{D1}$, and $Q_{S1}$ are because the photon flux arrives through different solid angles, accounted for by the lens's F#. Additionally, the detector also conduct thermal energy, through conductance $G_2$, to the heat bath 14, at temperature $T_{HB}$.

Analytically, the thermal conditions at the bolometer are represented as:

$$Q_R - Q_{DI} + Q_{SI} = \int_{T_{HB}}^{T_1} G_2(T) dT + \int_{T_1}^{T_1 + \delta T_1} j\omega C_1(T) dT \qquad (1)$$

$$= \sum_{n=0}^{\infty} \left[ \frac{\partial^n G_2(T)}{\partial T^n} \bigg|_{T_{HB}} \frac{(T_1 - T_{HB})^{n+1}}{(n+1)!} + j\omega \frac{\partial^n C_1(T)}{\partial T^n} \bigg|_{T_1} \frac{(\delta T_1)^{n+1}}{(n+1)!} \right]$$

The temperature dependence of $G_2(T)$ and $C_1(T)$ have been included in Equation 1. For conventional bolometers shown, for example, in FIG. 1, it is assumed that the derivatives of $G_1(T)$ and $C_1(T)$ are a weak function of temperature and for simplicity only first order terms are retained. At equilibrium, or constant flux conditions, the bolometer's equilibrium temperature $T_1^0$ is obtained from Equation 1, for $\omega = 0$, and is given by:

$$T_1^0 = T_{HB} + \frac{Q_R + Q_{SI} - Q_{DI}}{G_2 + 0.5 \frac{\partial G_2}{\partial T}(T_1^0 - T_{HB})} \qquad (2)$$

Thus, at equilibrium, the bolometer's temperature will be different from the heat bath temperature by the net power flow divided by the conductance $G_2$, measured at $T_1^0$. As expected, the more power the bolometer is receiving the higher will be its operating temperature, since it is directly proportional to the incident power, $Q_R + Q_{S1} > Q_{D1}$. Since $Q_{S1}$ is fixed in temperature, the bolometers temperature will change monotonicly with changes in scene temperature $T_S$; and changes in the detector's temperature are maximized with minimum conductance $G_2$.

Under dynamic conditions, a bolometer's operation is characterized by relating dynamic changes in the scene's temperature $\delta T_S$ to dynamic changes in the bolometer's temperature $\delta T_1$, about the thermal equilibrium temperature $T_1^0$. We assumed that the radiation shield is held at a constant temperature $\delta T_{HB} = 0$, hence no contribution are made by $\partial Q_{S1}/\partial T = 0$. Taking the differential of remaining terms in Equation 1, at temperature $T_1^0$, we obtain a relationship between $\delta T_1$ and $\delta T_S$ given by:

$$\delta T_1 = \frac{G_R}{G_{DI} + G_2^*} \frac{\delta T_S}{\left[ 1 + j\omega \left( \frac{C_1}{G_{DI} + G_2^*} \right) \right]} \qquad (3)$$

For brevity, we introduce $G_2^* = G_2 + (T_1^0 - T_{HB})\partial G_2/\partial T_1$. The dependence of $G_2^*$ on temperature is accounted for by the temperature derivative, given by $(T_1^0 - T_{HB})\partial G_2/\partial T_1$. In conventional bolometers, the analysis neglects the temperature dependence of $G_2^*$ and $C_1^*$ because it is assumed to be small. We include these for completeness, useful for applications with larger temperature dependent $G_2^*$ and $C_1^*$. The other variables in Equation 3 are: $G_R = \partial Q_R/\partial T_S = \sigma T_S^3 A_D/F^2$ is the conductance of thermal radiation through space from the scene; $G_{D1} = \partial Q_{D1}/\partial T_1 = 4\sigma T_1^3 A_D$ is the conductance of thermal radiation through space from the detector.

Equation 3 relates the dynamic changes in the scene's temperature $\delta T_S$ to changes in the bolometer's temperature change $\delta T_1$. The bolometer's signal $\delta T_1$ is monotonicly related to $\delta T_S$, and the maximum signal possible is when $\delta T_S = \delta T_1$. The attenuation from unity gain is represented by coefficient $G_R/[G_{D1}+G_2^*]$, and retardation is dependent on the thermal mechanical bandwidth, given by the radial frequency $\omega_{TM}=[G_{D1}+G_2^*]/C_1^*$. The dc attenuation merely reflects the fact that: (a) not all the energy from the scene element, corresponding the detector's footprint on the scene, is received by the detector; and (b), a portion of the energy radiated from the scene is shunted to the heat bath through conductance $G_2^*$. For maximum signal, conductances $G_{D1}$ and $G_2^*$ should approach in value $G_R$.

Hence, much effort has gone into minimizing the thermal conductance $G_2^*$ between the bolometer's absorber element 10 and the heat bath 14, by using bridges 12 made from materials with poor thermal conductivity. AC attenuation is minimized by minimizing $C_1^*/[G_{D1}+G_2^*]$, and this is accomplished by making $C_1^*$ small, or absorber elements with very small mass. However, the size of $C_1^*$ inversely impacts the thermal noise level at the absorber element and therefore it should not be made arbitrarily small. The maximum signal and minimum noise design criteria, given in terms of $G_{D1}$, $G_2^*$, and $C_1^*$, is developed from the noise analysis given below.

Noise Level in Bolometers

Several noise sources contribute to the total temperature variance at the detector including the absorber element 10 and all these contribute and limit the bolometer's sensitivity. The noise sources include: (1) variance in the scene's photon power absorbed by the absorber element, $\delta Q_R^2$, (2) variance in the photon power emitted by the absorber element, $\delta Q_{D1}^2$, (3) variance in the radiation shield's photon power absorbed by the absorber element, $\delta Q_{S1}^2$, (4) variance in the thermal bath 14 temperature, $\delta T_{HB}^2$, and (5) variance in the absorber's element temperature produced by noise in readout electronics, $\delta T_{EL}^2$.

Each of these noise sources causes sensitivity degradation and they are examined below. The effects of the various noise sources are quantified in terms of their contribution to the absorber element's temperature variance. Quantification in terms of the absorber element's temperature variances, is appropriate for the bolometer's sensitivity is typically given in terms of noise equivalent temperature resolution or, simply, NE$\Delta$T. Thus, the photon flux variance, from the scene, $\delta Q_R^2$, the absorber element, $\delta Q_{D1}^2$, and the shields, $\delta Q_{S1}^2$, produce temperature variances at the absorber labeled as: $\delta T_S^2$, $\delta T_1^2$, and $\delta T_{S1}^2$, respectively, and are computed below.

(1) Scene photon flux fluctuations increase the absorber's temperature variance. Fluctuations in the scene's photon signal impose the ultimate limit on the bolometer's sensitivity, represented in terms of Noise Equivalent Temperature resolution, NE$\Delta$T. The best, smallest NE$\Delta$T is achieved when all other noise sources, including noise from the absorber element, are much smaller than noise from fluctuations in scene's photon flux. This the minimum noise level corresponds to the noise variance $\delta Q_R^2$ of the signal power $Q_R$, arriving from the scene and absorbed by the absorber element, and is given by:

$$\delta Q_R^2 = \frac{8 A_D \sigma k_B T_S^5 \Delta f}{4 F^2} \quad (4)$$

where $\Delta f$ represents the electrical frequency bandwidth of the absorber element and $k_B$ is Boltzmann's constant. The denominator accounts for the fact that only a fraction of the signal reaches the detector and the size of the fluctuation is reduced as is the photon signal received from the scene.

The fluctuations in the scene's photon flux is readily translated into a temperature variance at the absorber element, and this represents background limited performance. The best sensitivity, given in terms of the temperature variance at the absorber element, $\delta T_S^2$, is obtained by combining Equations 3 and 4 and integrating over frequency. Specifically, the temperature fluctuations $\delta T_S^2$, at the detector, is produced by the scene radiation variance $\delta Q_R^2$ and is given by:

$$\delta T_S^2 = \frac{2}{\pi F^2} \int_0^\infty \frac{A_D \sigma k_B T_S^5}{[G_{DI} + G_2^*]^2 + \omega^2 [C_1^*]^2} d\omega \quad (5)$$

$$= \frac{G_R}{(G_{DI} + G_2^*)} \cdot \frac{k_B T_S^2}{C_1^*}$$

Equation 5 reveals that the temperature variance, induced by the scene on the absorber element 10, is a product of two factors. The first factor is the ratio of free space conductance to the conductance between the bolometer 10 and thermal bath 14: $G_R/[G_{D1}+G_2^*]$. The second factor corresponds to the temperature variance of an object at temperature $T_S$ and with heat capacity $C_1^*$. For best performance, the noise from the scene should dominate over all other noise sources; this is facilitated with a fast lens (small F#) and minimum conductance $[G_{D1}+G_2^*]$ (absorber element 10 with good thermal isolation).

(2) Variance in the absorber element's temperature $\delta T_1^2$ is produced by several sources, and this includes: (1) thermal conductance $G_2$ between the absorber element 10 and heat bath 14, (2) radiative conductance $G_{D1}$ between absorber element 10 and radiation shields, not shown, (3) and radiative conductance $G_S$ between absorber element and scene, just considered. Here, we focus on temperature variances due to thermal conductances $G_2^*$, and $G_{D1}$.

At the absorber element, the spectral density of temperature variance $\delta T_1^2(f)$ is given in terms of the different conductance paths between the absorber element and surroundings. The expression for the spectral temperature variance is given as:

$$\delta T_1^2(f) = \frac{4 k_B T_1^2 [G_2^* + G_{DI}]}{[G_2^* + G_{DI}]^2 + [\omega C_1^*]^2} \quad (6)$$

The integral of Equation 6 yields the well known thermodynamic expression $k_B T_1^2/C_1^*$, corresponding to the temperature variance of an object at $T_1$ with a heat capacity $C_1^*$. However, this total temperature variance includes contributions from radiative and thermal conductance paths. The radiative part is included by the $G_{D1}$ term in the denominator of Equation 6. Two contributors are included in $G_{D1}$ one from the scene and the other from the radiation shields: hence $G_{D1}=G_R+G_{S1}$, where $G_{S1}$ is the conductance between the radiation shield and the absorber element. Thus, the variance in the absorber element's temperature, not due to radiative contributions, is obtained by integrating Equation 6, leaving out the $G_{D1}$ term from the numerator. Performing the integration with respect to radial frequencies $\omega$, we obtain for $\delta T_1^2$:

$$\delta T_1^2 = \frac{1}{2\pi} \int_0^\infty \frac{4 k_B T_1^2 [G_2^*]}{[G_2^* + G_{DI}]^2 + [\omega C_1^*]^2} d\omega \quad (7)$$

$$= \frac{G_2^*}{G_2^* + G_{DI}} \frac{k_B T_1^2}{C_1^*}$$

Thus the absorber element's temperature variance, $\delta T_1^2$, is a product of two factors. The first factor indicates that other terms contribute to this temperature variance and these are separately accounted for. The second factor is the theoretical temperature variance of an object at temperature $T_1$ and with a heat capacity of $C_1^*$.

(3) Fluctuations in photon flux from the lens and housing (radiation shield), surrounding the absorber element, contribute to the overall temperature variance. Photons from the lens are indistinguishable from photons form the scene, represented by Equation 4. The temperature variance, produced by these fluctuations, is readily estimated in terms of the radiation conductance between the absorber element and shield, $G_{S1}=G_{D1}-G_R$. Proceeding as with Equations 6 and 7, the expression for temperature variance $\delta T_{S1}^2$, at the absorber element's, due to the radiation shield held at temperature $T_{S1}$, becomes:

$$\delta T_{SI}^2 = \frac{1}{2\pi} \int_0^\infty \frac{4k_B T_{SI}^2 [G_{DI}^* - G_R]}{[G_2^* + G_{DI}]^2 + [\omega C_1^*]^2} d\omega \quad (8)$$

$$= \left[\frac{G_{DI} - G_R}{G_2^* + G_{DI}}\right] \frac{k_B T_{SI}^2}{C_1^*}$$

The temperature variance $\delta T_{S1}^2$ is given as a product of two factors. The first factor indicates that this contribution is attenuated by the ratio of $G_{S1}=G_{D1}-G_R$ to the total conductance, $G_{S1}+G_{D2}$. The second factor is the theoretical temperature variance of an object at temperature $T_{S1}$ and with a heat capacity of $C_1^*$. Typically, the radiation shield's temperature equals to the heat bath temperature, $T_{HB}$. Hence, we typically substitute $T_{HB}$ for $T_{S1}$, in Equation 8.

(4) Thermal bath fluctuations contribute to the variance in absorber element's temperature. The temperature variance $\delta T_{HB}^2$ in the temperature of the heat bath 14 (FIG. 1) $T_{HB}$ is given as:

$$\delta T_{HB}^2 = \frac{k_B T_{HB}^2}{C_{HB}} \quad (9)$$

where, $C_{HB}$ is the heat capacity of the heat bath. The variance $\delta T_{HB}^2$ can be made small by increasing the mass of the heat bath 14, and in principle this can make $\delta T_{HB}^2$ arbitrarily small relative to the other noise sources. This is particularly important, for the temperature variance in the heat bath 14 is directly coupled to the absorber element 10. Specifically, typically, $G_2^* >> G_R$, $G_{D1}$, and $G_{S1}$, hence, with the equivalent circuit in FIG. 2 this provides direct evidence that the variance $\delta T_{HB}^2$ modulates the detector's temperature with a coupling coefficient approaching unity. Thus, for all practical purposes, the temperature variance in the heat bath 14 replicates itself as a variance in the absorber element's temperature and is given by Equation 9.

(5) Noise in the absorber element's readout circuits contribute to the detector's temperature variance. The readout circuit noise is given by a voltage squared spectral density $de_{na}^2/df$, which includes 1/f and white noise components. In this analysis, this voltage noise is translated to an equivalent variance in temperature at the absorber element. This translation from variances in voltage to variances in temperature facilitates the analysis and the computation of NEΔT. Translating the readout circuit's voltage noise into an equivalent variance in temperature requires consideration of the actual readout circuits and the bolometer. In this analysis, consistent with the fact that resistive bolometers are the most widely used, we analyze the performance of a conventional resistive bolometer.

Resistive Bolometer

The readout circuit's voltage noise corrupts the output from a resistive bolometer, biased with a dc current $I_{CR}$. For improved understanding, the corruption produced by electronic circuit noise is transformed into an equivalent temperature variance. This equivalent variance in the absorber element's temperature, caused by electronic voltage noise, is labeled as $\delta T_{EL}^2$.

Figure 3:
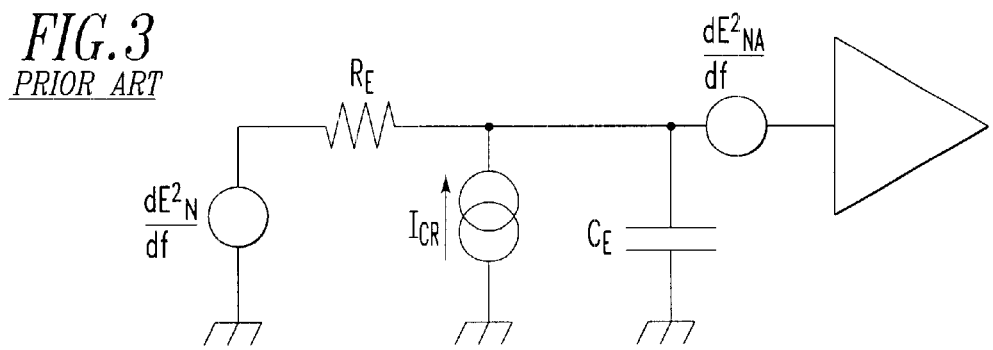
FIG. 3 is an electrical noise equivalent circuit of the bolometer shown in FIG. 1.

The total electrical noise presented at the readout circuit, shown in FIG. 3, is a sum of spectral voltage noise variances from the absorber element's $dE_N^2/df$ and amplifier $dE_{NA}^2/df$. The voltage noise from the absorber element is filtered by the circuit capacitance $C_E$, and is in series with the noise form the amplifier. The equivalent temperature variance produced by the voltage noise at the readout amplifier's input is:

$$\delta T_{EL}^2 = \frac{1}{\left[I_{CR} \frac{\partial R_{CB}}{\partial T_S}\right]^2} \cdot \frac{1}{2\pi} \int_0^\infty \left[\frac{\frac{dE_N^2}{df}}{1 + (\omega C_E R_E)^2} + \frac{dE_{NA}^2}{df}\right] d\omega \quad (10)$$

where, the leading factor in Equation 10 converts the variance in voltage noise to a temperature variance by dividing by $I_{CR}\partial R_{CB}/\partial T_S$, squared, where $\partial R_{CB}/\partial T_S$ represents the resistive temperature coefficient, and $I_{CR}$ is the dc bias current flowing through the absorber element during readout. The second factor in Equation 10 contains the variances of the absorber element's and the amplifiers voltage noise spectral density.

For best performance, the absorber element's resistive temperature coefficient $\partial R_{CB}/\partial T_S$ should be made large for this directly attenuates the contributions of voltage noise to the temperature variance, see Equation 10. Making the absorber element's dc bias current $I_{CR}$ large, helps in principle, but has practical problems: the associated $I^2R$ heating is much larger (>1000×) that the IR signal and requires pulsed operation (wider noise bandwidth) of the absorber element's readout circuits. Additional noise reduction is achieved by selecting readout amplifiers with a spectral voltage variances $dE_{NA}^2/df$ smaller than the absorber element's, $dE_N^2/df$. Such conditions are facilitated with large resistance absorber elements. Typically, the absorber element's resistance is greater than 10KΩ, which represents a white noise voltage spectral density of 12.9 nV/Hz$^{1/2}$. This value does not include 1/f noise terms which complicate the integration of Equation 10. If we assume that only the white noise from the bolometer dominates, than Equation 10 can be readily integrated and the result is given by:

$$\delta T_{EL}^2 = \frac{1}{\left[I_{CR} \frac{\partial R_{CB}}{\partial T_S}\right]^2} \cdot \frac{0.25}{C_E R_E} \left[\frac{dE_N^2}{df}\right] \quad (11)$$

For the purpose of calculations, we can increase the value of $dE_n^2/df$ to compensate for 1/f noise components, and we choose to use 0.1 $\mu$V/Hz$^{1/2}$ for the value of $d^2E_N/df$. It should be also noted that the value of Equation 11 is proportional to the electrical readout bandwidth given as $\omega_{EL}=1/C_E R_E$. Ideally, $\omega_{EL}$ should equal the thermal bandwidth $\omega_{TM}=[G_{D1}+G_2^*]/C_1^*$. Typically, the thermal bandwidth is narrower than the electrical readout bandwidth ($\omega_{EL}>\omega_{TM}$) by a constant factor $K_{BW}$, so that $\omega_{EL}=K_{BW}\omega_{TM}$.

The absorber element's total temperature variance $\delta T_T^2$ is simply the sum of Equations 5, 7, 8, 9 and 10. If we assume d $E_n^2$/df is constant with frequency and after some rearrangements, the equation for $\delta T_T^2$ is given by:

$$\delta T_T^2 = \left(\frac{k_B T_S^2}{C_1^*}\right) \cdot \left(\frac{G_R}{G_{DI}+G_2^*}\right) \cdot \left\{ \begin{array}{l} 1+\left(\frac{G_2^*+G_{DI}-G_R}{G_R}\right)\frac{T_1^2}{T_S^2} + \\ \frac{C_1^*}{C_{HB}}\left(\frac{G_R+G_2^*}{G_R}\right)\frac{T_{HB}^2}{T_S^2} + \\ \left(\frac{G_R+G_2^*}{G_R}\right)\frac{C_1^*}{k_B T_S^2}\frac{0.25}{\left(I_{CR}\frac{\partial R_{CB}}{\partial T_S}\right)^2} \end{array} \right\} \quad (12)$$

Equation 12 had been cast into this form to reveal the relative values of every noise source relative to the noise present in the signal. Equation 12 is made up of a product of three terms. The leading factor is the minimum thermodynamically possible temperature variance at an absorber, i.e. element 10, limited by the detector's heat capacity and scene temperature. The second factor shows how this minimum temperature variance is increased since the absorber element's thermal isolation is not as good as the isolation between the scene and the absorber. The third factor, in the braces, includes different noise sources which increase the absorber element's overall temperature variance. When the expression in the braces equals one, the dominant noise is scene noise or BLIP.

The temperature resolution of the bolometer is limited by the variance, given by Equation 12, and is simply equal to the standard deviation: the square root of Equation 12. Combining this with the signal amplitude (given by Equation 3) the bolometer's performance is determined. The bolometer's performance in terms of NE$\Delta$T is calculated below.

Sensitivity of Conventional Bolometers

The sensitivity of bolometers is given in terms of their temperature resolution NE$\Delta$T. The NE$\Delta$T is the minimum temperature the bolometer can resolve and occurs when the absolute signal to noise ratio is unity. The signal to noise ratio is readily calculated with Equations 3 and 12. The signal to noise ratio equals the signal induced temperature change in the absorber element's, given by Equation 3, divided by the RMS fluctuation in the absorber element's temperature, given by the square root of Equation 12. For unity signal to noise ratio, solving for $\delta T_S$, the equation obtained for NE$\Delta$T is:

$$NE\Delta T = \sqrt{\frac{\omega_{TM} k_B T_S^2}{G_R}} \sqrt{1+\left(\frac{\omega}{\omega_{TM}}\right)^2} \left\{ \begin{array}{l} 1+\left(\frac{G_2^*+G_{DI}-G_R}{G_R}\right)\frac{T_1^2}{T_S^2} + \\ \frac{C_1^*}{C_{HB}}\left(\frac{G_{DI}+G_2^*}{G_R}\right)\frac{T_{HB}^2}{T_S^2} + \\ \frac{C_2^*}{k_B T_S^2}\left(\frac{G_{DI}+G_2^*}{G_R}\right)\frac{\omega_{EL}}{4}\frac{dE_N^2}{df} \\ \left(I_{CR}\frac{\partial R_{CB}}{\partial T_S}\right)^2 \end{array} \right\}^{1/2} \quad (13)$$

The expression for NE$\Delta$T has been simplified by incorporating into Equation 13 $\omega_{TM}=[G_{D1}+G_2^*]/C_1^*$ and $\omega_{EL}=1/R_E C_E$. Thus, NE$\Delta$T is expressed as a product of three factors. The first factor represents the low frequency thermodynamic sensitivity limit determined by: the thermal bandwidth $\omega_{TM}$, and $G_R$, dependent on the optics F#, the detector size $A_D$, and the scene temperature $T_S$. The second factor indicates how the sensitivity decreases with frequency $\omega_{TM}=[G_{D1}+G_2^*]/C_1^*$. The third factor includes the contributions from various noise sources: (1) noise in the scene signal, (2) noise from the absorber element 10, including radiation shields, (3) noise from the thermal bath 14, and (4) noise from the electronic readout circuits.

The NE$\Delta$T is expressed as a product of three factors in Equation 13. Maximum sensitivity, i.e., the smallest NE$\Delta$T, is achieved by minimizing each of these factors. The middle factor in Equation 13 represents the radial frequency dependence of NE$\Delta$T. Optimally, the thermal radial cut-off frequency $\omega_{TM}$ should be made equal to the system frame rate. Setting $\omega_{TM}$ at the system frame rate will maximize the system's dc sensitivity and this is evident from the first factor in Equation 13. The First factor in Equation 13 dictates that for maximum sensitivity: $\omega_{TM}$ be set at a minimum, the optics F# should be as small as possible (fast optics), and the absorber's size $A_D$ should be as large as possible, while satisfying system resolution requirements. The third factor explicitly includes all the noise terms and for best sensitivity it should be minimized to unity.

The steps required to minimize the third factor to unity are revealed by examining in detail each of the noise terms. The noise terms in the third factor are divided into three groups. The first group represents radiation noise from the scene and the absorber (including radiation shields) noise. The minimum noise occurs if the scene noise dominates. This is facilitated by using a small F# (fast optics), operating the detector $T_D$ and radiation shields $T_{HB}$ colder than the scene temperature $T_S$.

The middle term in the third factor in Equation 13, represents heat bath noise contributions, coupled through thermal contact $G_2^*$, to the absorber. Reduction of the heat bath noise contributions are readily minimized by making $C_{HB}>>C_1^*$. By making the heat capacity sufficiently large, the heat bath noise is severely reduced and no other steps are needed to achieve further reductions.

The bottom term in the third factor in Equation 13 represents the readout electronics noise contribution to the absorber element's. Reducing the readout electronics noise below the scene noise in the signal is difficult. The difficulty becomes evident by quantitively examining the bottom term in third factor in Equation 13. Optimistically, let's assume that the noise from the resistive bolometer dominates, and typically for a $10^4\Omega$ resistor the noise $dE_N^2$/df is about $2\times10^{-16}$V$^2$/Hz. This does not include 1/f noise which makes things even worse. In resistive bolometers, $\partial R_{CB}/\partial T_S\approx 200\Omega/K$ and $G_2^*/G_{D1}\approx 10$. For: $T_S\approx 300K$, $T_1\approx 213K$, $A_D=0.25\times 10^{-4}$cm$^2$, and F=1; we evaluate the bottom term in the third factor in Equation 13, and obtain $(\omega_{EL}/\omega_{TM})$ $1.3\times 10^{-9}/I_{CR}^2$. This expression, for the electronic noise contribution, should be significantly less than 1 to make electronic noise insignificant. If $(\omega_{EL}/\omega_{TM})=1$, the required circuit current $I_{CR}>>0.04$ mA. If the 1/f noise is included, the required current level is probably $I_{CR}>1$ mA. With $I_{CR}\approx 1$ mA, during readout, the I$^2$R power delivered is about 10 m Watts, verses 1 $\mu$ Watts delivered from the scene This means the readout I$^2$R power is 10 thousand times greater then the power in the signal. This is unacceptable for it introduces thermal stability problems, which can be reduced by reducing readout circuits operational duty cycle. In a staring array, with 400×500 elements, for example, the readout duty cycle can be reduced by up to $2\times 10^5$ fold to alleviating thermal problems. However the noise bandwidth is increases inversely with readout duty cycle whereas readout noise decreases as a square of the readout current $I_{cr}$, i.e., $(\omega_{EL}/\omega_{TM})1.3\times10^{-9}/I_{CR}^2$. This solution has practical limitations due to the current capacity of the bolometer and the readout circuit's maximum voltage compliance. Thus, increasing the $I_{CR}$ and decreasing the duty cycle provides insufficient improvements but has practical limitations. The aforementioned limitation can be overcome with a new approach described in the next section.

THE INVENTION

It is evident from the previous discussion on NEΔT (see Equation 13) that the bolometer's sensitivity is reduced by the ratio $(G_{D1}+G_2^*)/G_R$. Similarly, the photoresponse amplitude (see Equation 3) is also degraded by the ratio $G_R/(G_{D1}+G_2^*)$. Since $G_{D1}$ and $G_R$ are limited by the optics, performance improvements requires the reduction of the thermal conductivity $G_2^*$ between the absorber element 10 and the heat bath 14. Clearly, much effort has been invested into minimizing thermal conductivity $G_2^*$ by utilizing special materials and geometries. Presently, the value achieved for $G_2^* \approx 2\times10^{-7}$ Watts/K, and this is about ten times larger than $G_{D1}$. In fact, what is needed, is for $G_2^*$ to be ten times smaller than $G_{D1}$. Given the limitations inherent with material and geometrical approaches, further reductions in $G_2^*$, thermal conductivity between the bolometer and heat bath, require a different approach.

The present invention is directed to such an approach whereby an ultra sensitive silicon sensor (USSS), included, for example, in an array of pixels 9 is fabricated using only silicon technology and electro-thermal feedback to substantially reduce the thermal conductivity $G_2^*$. With the electro-thermal feedback, a ten fold improvement in the thermal isolation of the bolometer pixel can be achieved, with: (1) associated improvements in NEΔT; and (2) an increase in photoresponse amplitude. The operation and performance advantages of an USSS are detailed below by first describing the operation and structure of a single pixel.

We begin by elaborating how electro-thermal feedback provides a ten fold reduction in thermal conductivity over prior art approaches based only on optimally low conductivity materials and geometries. This explanation is followed by an photoresponse and noise levels analysis for the USSS pixel.

Maximum Thermal Isolation Through Electro-Thermal Feedback

Thermal isolation between the absorber element 10 and heat bath 14 of FIG. 1 can be significantly improved in accordance with the subject invention with the use of electro-thermal feedback. Maximizing thermal isolation through electro-thermal feedback is first demonstrated by analysis. For simplicity and clarity, the analysis is limited to a dc response. The analysis of the USSS pixel in accordance with the subject invention will include ac and dc components.

Figure 4:
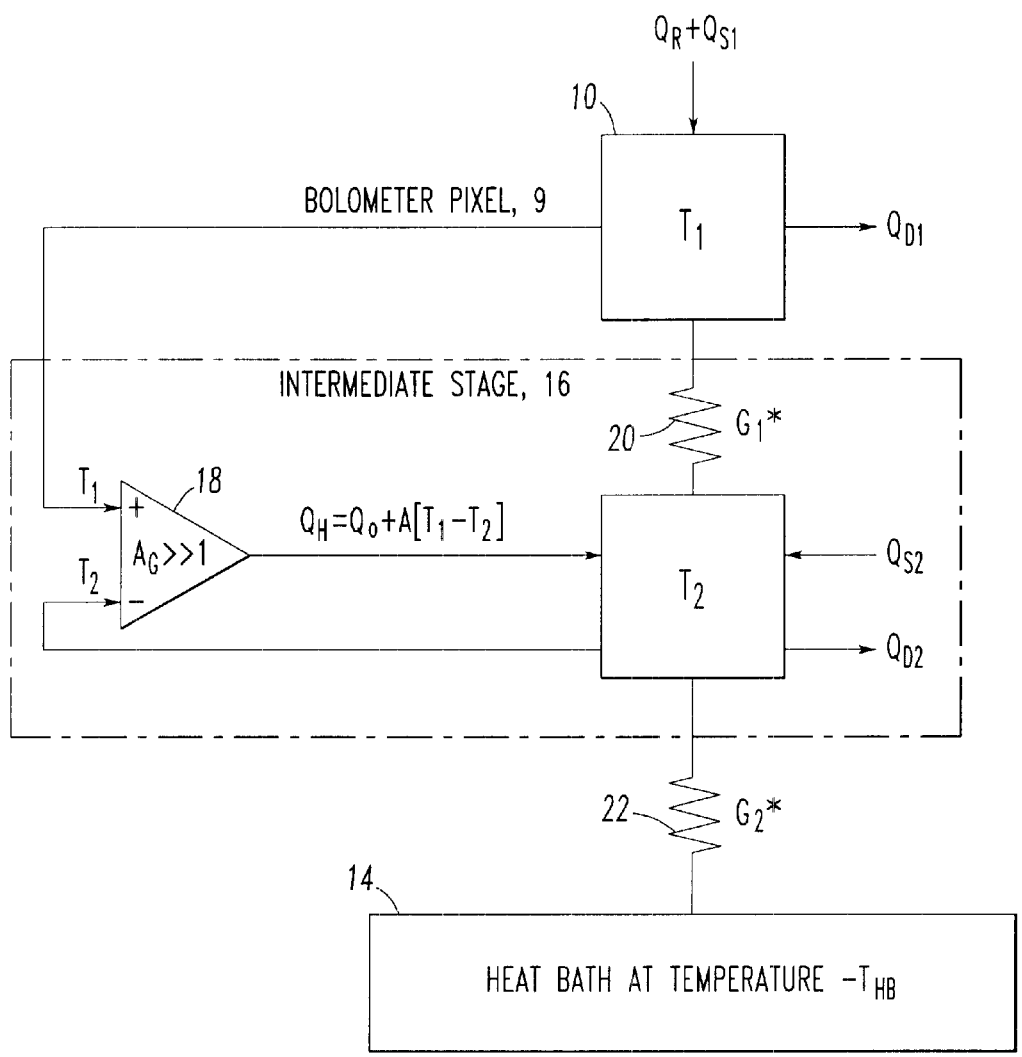
FIG. 4 is an electrical block diagram illustrative of an electro-thermal feedback circuit for a bolometer in accordance with the subject invention.

Referring now to FIG. 4, shown thereat is a USSS pixel 9 including an absorber element 10, at temperature $T_1$, thermally connected to the heat bath 14, at temperature $T_{HB}$, thorough an intermediate stage 16 at temperature $T_2$. We assert that by design $T_{HB}$ is always less than $T_1$ and $T_2$. In addition to normal effects, the relationship between $T_1$ and $T_2$ is most influenced by an electro-thermal feedback circuit, represented by an amplifier 18. The amplifier 18 is used to generate heat $Q_H$ in the intermediate stage 16. The generated heat is proportional to the difference between temperatures $T_1$ and $T_2$, specifically, $Q_H=Q_o+A(T_1-T_2)$, where $Q_o$ and $A$ are constants.

As in a conventional bolometer, thermal radiation $Q_R+Q_{S1}$ is received from the scene and radiation shields. Thermal radiation $Q_{D1}$ is emitted by the absorber element 10. The intermediate stage 16 also radiates thermal energy $Q_{D2}$ and receives from the radiation shields thermal radiation $Q_{S2}$. Additionally, links $G_1^*$ and $G_2^*$, shown as resistive elements 20 and 22, thermally and electrically interconnect the absorber element 10, the intermediate stage 16, and the heat bath 14. The effective thermal impedance between the absorber element and the surrounding needs to include the effects of the electro-thermal feedback. The effect of the electro-thermal feedback on thermal isolation is calculated from heat conservation equations. The dc heat conservation equation at the intermediate stage 16 is:

$$(T_1-T_2)G_1^*+Q_H+Q_{S2}=Q_{D2}+(T_2-T_{HB})G_2^* \tag{14}$$

Since the radiation shields and the heat bath are held at the same constant temperature, the terms $Q_{S2}$ and $T_{HB}$ are constant in Equation 14. Taking the differential of Equation 14, the relationship between temperatures $T_1$ and $T_2$ is computed and is given by:

$$\delta T_2 = \frac{(G_1^* + A)}{(G_1^* + G_2^* + G_{D2} + A)}\delta T_1 \tag{15}$$

where $G_{D2}$ is the radiative conductance from the intermediate stage to it's surroundings. It should be noted that if the electro-thermal feedback constant A is made sufficiently large, temperature changes in $\delta T_2$ approaches $\delta T_1$, representing very good thermal tracking. The coupling between changes in the scene temperature $\delta T_S$ and changes in the absorber element's temperature $\delta T_1$ is obtained from heat conservation at the absorber element's and given by:

$$Q_R+Q_{S1}=Q_{D1}+(T_1-T_2)G_1^* \tag{16}$$

Only the $Q_{S1}$ term is constant in Equation 16 since the shields are maintained at a constant temperature. Taking the temperature differential of Equation 16, we obtain a relationship between temperatures $T_S$, $T_1$ and $T_2$, given by:

$$G_R\delta T_S=(G_{D1}+G_1^*)\delta T_1-G_1^*\delta T_2 \tag{17}$$

By combining Equations 15 and 17, the intermediate stage temperature differential, $\delta T_2$, is eliminated, and we obtain a relationship between $\delta T_S$ and $\delta T_1$ given by:

$$\delta T_1 = \frac{G_R}{G_{DI} + G_1^*\left(\frac{G_2^* + G_{D2}}{G_1^* + G_2^* + G_{D2} + A}\right)}\delta T_S \approx \frac{G_R}{G_{DI} + \frac{G_2^*G_1^*}{A}}\delta T_S \tag{18}$$

For a large electro-thermal feedback constant A $(A>>\{G_1^*, G_2^*, G_{D2}\})$, the denominator in Equation 18 reduces to $G_{D1}$. Thus large electro-thermal feedback severely attenuates the thermal shunting effects from $G_1^*$, thereby effectively increasing the absorber element's thermal isolation. This is evident by comparing the temperature changes produced at the absorber element by a $\delta T_S$ change in scene temperature. Specifically, with electro-thermal feedback, a $\delta T_S$ change in scene temperature causes a change in the absorber element's temperature to increase from $\delta T_S G_R/(G_{D1}+G_2^*)$ (see Equation 3) to $\delta T_S G_R/G_{D1}$ (see Equation 18). Since, typically $G_2^* \cong 10\, G_{D1}$, a ten fold increase in photoresponse is achieved, directly leading to better sensitivity.

Using the principal of electro-thermal feedback, improved thermal isolation is achieved and the degree of isolation achieved is beyond the isolation possible through optimizing thermal insulating materials and/or geometrical approaches. Incorporating the principal of electro-thermal feedback, we proceed to present and analyze the performance of the subject Ultra Sensitive Silicon Sensor (USSS) pixel.

USSS Pixel Embodiments and Operating/Readout Electronics

Incorporation of electro-thermal feedback, to form an ultra sensitive silicon sensor, requires combining special circuits within each USSS pixel 9. Specifically, electro-thermal feedback requires: (1) a temperature difference sensor, (2) a temperature difference amplifier, (3) a heater with an output dependent on temperature difference, and (4) a structure which incorporates items 1 through 3 with our absorber element into a single pixel, shown in FIGS. 5, 6, and 8.

Figure 5:
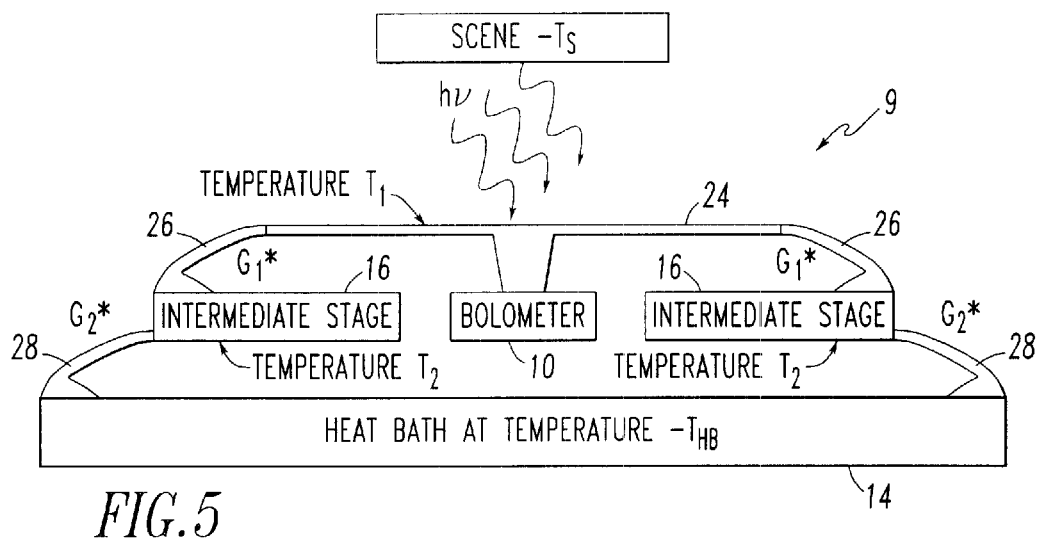
FIG. 5 is illustrative of a three-tier bolometer configuration in accordance with a first embodiment of the subject invention.

With respect to (4) above, in FIG. 5, the USSS pixel 9 utilizes a three-tier design for maximizing area efficiency and is shown including an absorber element 10 at $T_1$ and having a flat upper absorber portion 24 having a predetermined surface area, an intermediate stage 16 at $T_2$ adjacent to the absorber element 10 and a heat bath (substrate) 14 at $T_{HB}$. Further as shown support elements or links 26 and 28 providing conductances $G_1^*$ and $G_2^*$ separate the absorber element 10, the intermediate stage 16 and the heat bath 14.

Figure 6:
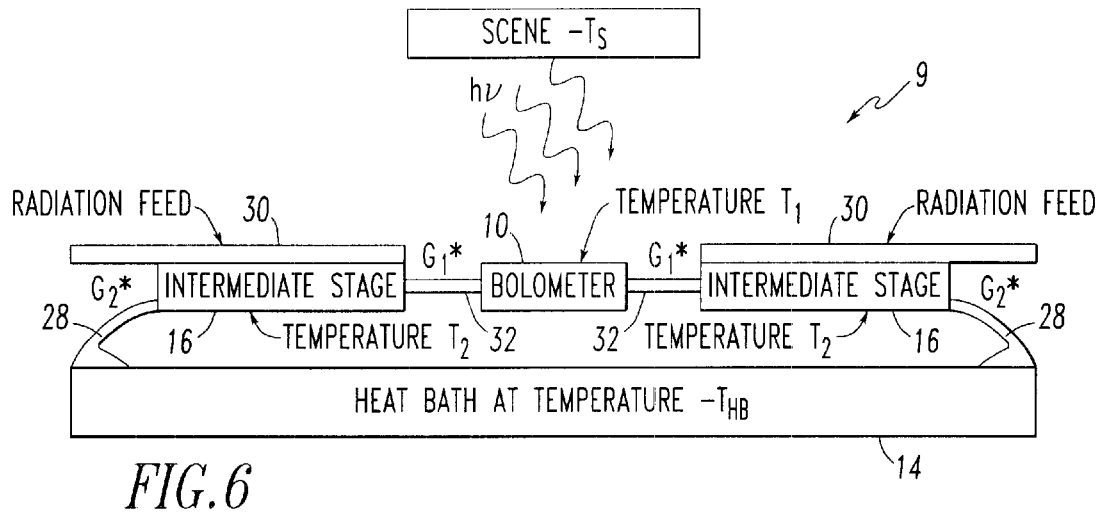
FIG. 6 is a diagram illustrative of a two-tier bolometer configuration including incorporating an antenna element in accordance with a second embodiment of the subject invention.

The USSS pixel design in a second embodiment is changed to a simpler two-tier approach by utilizing an antenna. Such a pixel 9 is shown in FIG. 6, and incorporates an antenna member 30 in place of the upper extension 24 to the absorber element 10 shown FIG. 5. The absorber element 10 and the intermediate stage 16 are now coplanar and are made from the same piece of silicon that the substrate is made from. Selective etching will delineate these elements from the substrate. The absorber element is electrically and mechanically connected to the intermediate stage 16 by the generally horizontal links 32 having a thermal conductance $G_1$. Each link 32 is made up of a very small insulator, with a poor thermal conductivity, and a thin electrical wire to provide mechanical support and electrical readout of a diode 34 (FIG. 9), which senses the absorber element's temperature. The two-tier design in FIG. 6 utilizes an annular intermediate stage 16 surrounding the absorber element 10. From the top, these can be viewed as a donut ring, representing the intermediate structure 16, surrounding the absorber element 10, located in the center. The antenna 30 is mounted on top of the intermediate stage 16 and feeds radiation into the absorber element 10, thereby acting as a concentrator funneling the electromagnetic energy incident on the pixel into the absorber element. The antenna and intermediate stage are in good thermal contact.

Figure 7A:
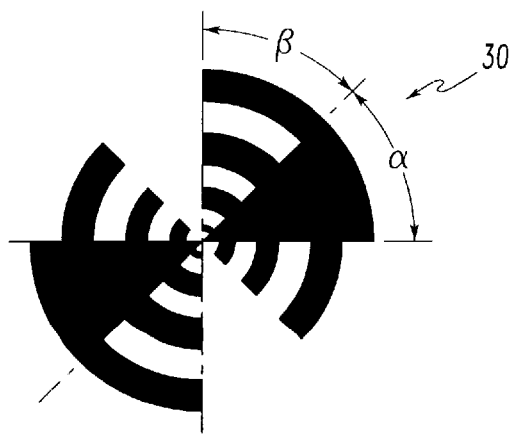
FIG. 7 is a top plainer view of the antenna element for the bolometer configuration in FIG. 6.

The details of the antenna 30 is shown in FIG. 7A and comprises a complementary toothed log periodic type antenna. Since it is formed over the intermediate stage 16, the electromagnetic energy falling over the intermediate area is channeled into the absorber element 10. The antenna channeling effective increases the active area within each pixel to nearly 100%. The antenna furthermore is typically fabricated from a high conductivity metal, for example, gold.

Figure 7B:
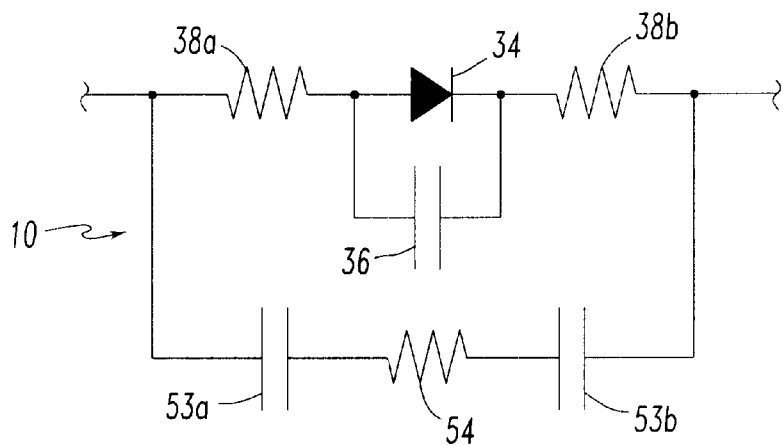

The temperature sensor of the absorber element 10 is represented in FIG. 7B as the diode 34 (FIG. 8) shunted by an internal capacitor 36 and in series with two thermal/electrical links 38a, 38b for reading out the diode. At the frequency of interest, capacitors 53a and 53b will direct all the power into the antenna load resistor 54 in series with capacitors 53a and 53b. The thermal energy absorbed by the resistor 54 will modulate the temperature of the sensing diode 34 which is thermally integrated with resistor 54. Shunting capacitors 53a and 53b are used to couple the electromagnetic energy into the resistor 54. Thus, the absorber element includes resistor 54, feed through capacitors 53a and 53b and read out through links 38a and 38b using the diode 34 as the temperature sensor. The beam width, or radiation acceptance cone angle, for the antenna 30 can be adjusted. It is known that a toothed log periodic antenna, with a self-complimentary design, offers very wide bandwidth operation, with nearly constant input impedance. As shown, the antenna 30, has radial symmetry, relative to an axis perpendicular to the plane. The antenna's radiation pattern is just like a lens.

Figure 8:
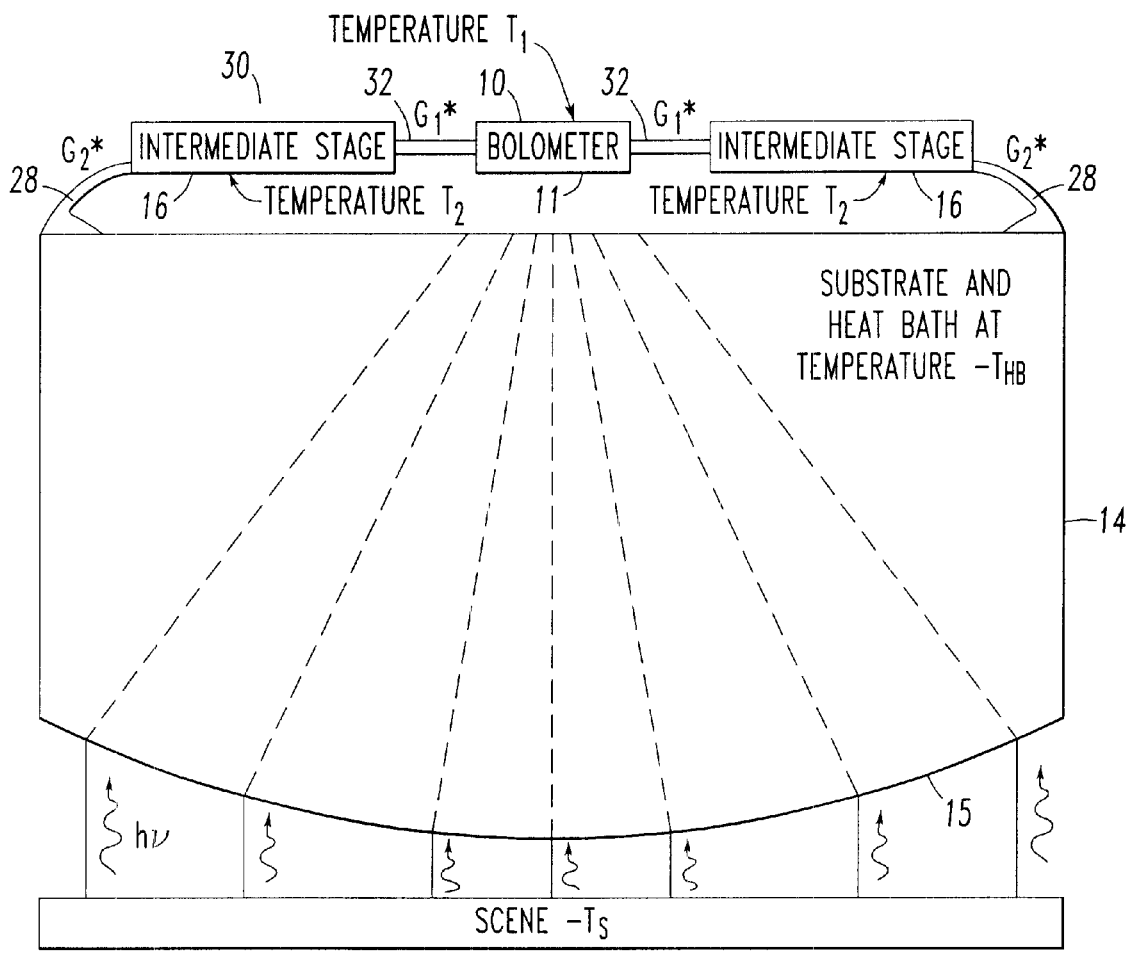
FIG. 8 is a diagram illustrative of a two-tier bolometer configuration incorporating a lens in the substrate and heat bath in accordance with a third embodiment of the subject invention so that the lens can be interior to the substrate.

A modification of the embodiment of the invention shown in FIG. 6 is shown in FIG. 8 and comprises a pixel 9 also including two-tier approach but one now utilizing a lens 15. In the embodiment shown in FIG. 8 the lens 15 is formed in the substrate and the heat bath 14. The lens 15 can be incorporated within the body (interior) of the substrate 14. The absorber element 10 and the intermediate stage 16 are again coplanar and made from the same piece of silicon that the substrate is made from. The Lens 15 shown as part of the substrate includes and enlarged body portion having a convex face, functions as a concentrator, funneling the electromagnetic energy incident on the pixel's back side 11 into the absorber element 10. It should be noted that the lens 15, incorporated within each USSS pixel 9, also could be located in the front side of the absorber element 10. The same improvements will be gained as with the lens that is formed inside the substrate. However a lens located in front will be made from a separate material and attached over each USSS pixel. In either case the spacing between the pixel lens 15 and the absorber element 10 is sufficiently close for evanescent coupling, for maximum concentration of the incident electromagnetic energy.

The spectral response of the USSS can be adjusted by the spectral response of the absorber 10, the antenna 30, or the lens 15. By adjusting the spectral response of any one of these elements, the response of the USSS can be tailored to operate, for example, in the LWIR, MWIR ranges, and in the region of 94 GHz and 220 GHz. The spectral response is dictated by the system application. Furthermore, the USSS can be made to respond concurrently to several different spectral bands by properly tuning the USSS pixels.

Figure 9:
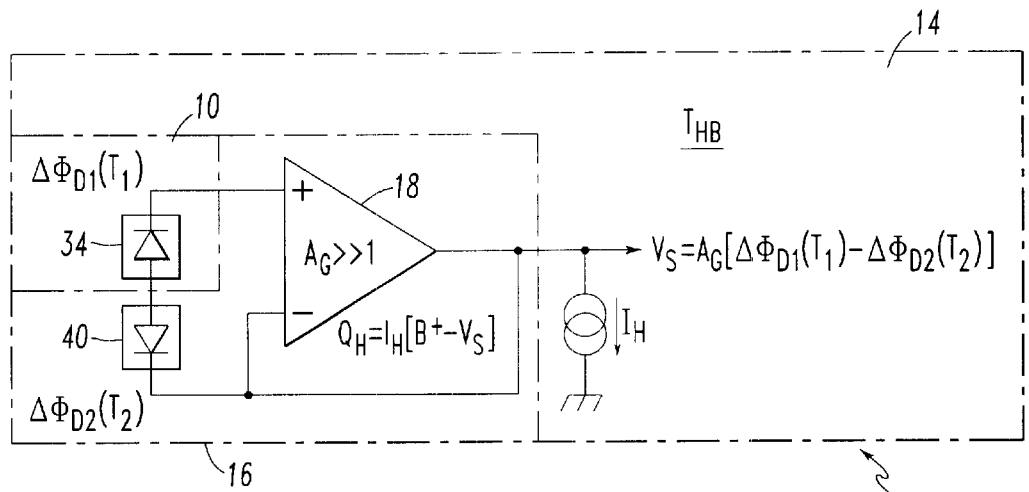
FIG. 9 is an electrical circuit diagram illustrative of the electro-thermal feedback circuit implemented in the bolometer configurations shown in FIGS. 5, 6, and 8.

Referring now to FIG. 9 shown thereat is a electro-thermal feedback circuit in accordance with the subject invention which adjusts the power $Q_H$ applied to the intermediate stage 16 to make the temperature $T_2$ thereof converge to the temperature $T_1$ of the absorber element 10. Minimizing the temperature difference between the $T_1$ and the $T_2$ effectively makes the conductance $G_1^*$ shown in FIGS. 5 and 6 go to less than the radiation limited value $G_R$.

Figure 10:
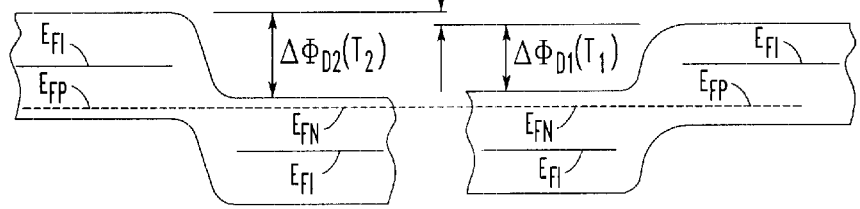
FIG. 10 are two band diagrams helpful in understanding the operation of the diode and absorber element circuitry for sensing the temperature differences between the intermediate stage and absorber element shown in FIG. 9.

As noted above, electro-thermal feedback requires a temperature difference sensor. The temperature difference sensor in FIG. 9 utilizes two silicon diodes 34 and 40, connected back to back, to measure the temperature difference between the absorber element 10 and the intermediate stage 16. One of diodes, i.e. diode 34 is incorporated in the absorber element 10. The second diode 40 is now incorporated in the intermediate stage 16. Each of the silicon diodes 34 and 40 exhibits a temperature dependant Fermi level that is illustrated in FIG. 10. The Fermi level's temperature dependence causes the potential difference $\Delta\Phi_{D2}(T_2)$ between the conduction (or valence) band levels on the p-side and n-side to change with temperature. The Fermi energy shifts to insures charge neutrality in the semiconductor. At very high temperatures the Fermi energy lies at mid-gap and at very low temperatures is midway between the impurity level and a band edge. For Silicon, the Fermi energy changes with temperature by about −2mK per degree Kelvin. Thus the offset between p-type and n-type conduction (or valence) band edges changes with temperature giving rise to a temperature dependent $\Delta\Phi_{D1}(T_1)$ and $\Delta\Phi_{D2}(T_2)$, see FIG. 10. Connecting diodes 34 and 40 back to back, as shown in FIG. 9, gives rise to a potential difference designated as $\delta\Phi_{12}(T_{12})=\Delta\Phi_{D2}(T_2)-\Delta\Phi_{D1}(T_1)$. For $T_2>T_1(T_2<T_1)$, $\delta\Phi_{12}(T_{12})$ will be positive (negative). The signal from this back to back diode arrangement controls the heater for controlling the intermediate stage temperature $T_2$.

As shown, the electro-thermal feedback circuit of FIG. 9 utilizes a single voltage amplifier 18 for USSS readout and also functions as a heater, with output power $Q_H$ for controlling $T_2$. Combining readout and heater functions facilitates pixel miniaturization. The power $Q_H$ delivered into the intermediate stage 16 depends on the temperature difference between $T_1$ and $T_2$. If $T_2>T_1$ ($T_{2<T1}$) the $Q_H$ power delivered decreases (increases) thereby converging $T_2$ towards $T_1$. The circuit diagram shown in FIG. 9 illustrates how the USSS readout and heater functions are combined into a single amplifier. The difference between thermal potentials across diodes 34 and 40 is amplified by the amplifier 18 to produce an output voltage $V_S$. Relative to a dc level, the amplifier's output will be positive (negative) if $T_{2>T1}$ ($T_2<T_1$). With more positive (negative) $V_S$, the power $Q_H$ delivered by the amplifier decreases (increases). Accordingly, the power $Q_H$ delivered by amplifier 18 depends on the output signal $V_S$ and is given by:

$$Q_H = I_H B^+ - I_H V_S = I_H B^+ - I_H A_G [\Delta\Phi_{D1}(T_1) - \Delta\Phi_{D2}(T_2)] \quad (19)$$

Where $A_G$ is the amplifier's voltage gain and $I_H$ is the dc bias current flowing between B+ and $V_S$. The amplifiers voltage gain is typically greater than $10^4$ and $I_H$ is about 1 μA. The bias voltage B+ is about 10 volts. Since B+ and $I_H$ are constants, as $V_S$ decreases (increases) the power consumed by the amplifier increases (decreases). The differential power is readily computed from Equation 19 and given as:

$$\delta Q_H = -I_H A_G \left[ \frac{\partial (\Delta\Phi_{D1}(T_1))}{\partial T_1} \delta T_1 - \frac{\partial (\Delta\Phi_{D2}(T_2))}{\partial T_2} \delta T_2 \right] \quad (20)$$

$$\approx -I_H A_G \frac{\partial (\Delta\Phi_{D1}(T_1))}{\partial T_1} [\delta T_1 - \delta T_2]$$

Since the Fermi level's $E_F$ temperature coefficients in diode 34 ($D_1$) and 40 ($D_2$) are about equal: $\partial[\Delta\Phi_{D1}(T_1)]/\partial T_1 \approx \partial[\Delta\Phi_{D2}(T_2)]/\partial T_2 \approx \partial E_F(T_1)/\partial T_1 \approx \partial E_F(T_2)/\partial T_2 \approx -2$ mV/K. Analogous to the electro-thermal coefficient A used in FIG. 4 and Equation 14–18, for the USSS the expression for the electro-thermal coefficient A is given by:

$$A \approx -I_H A_G \left[ \frac{\partial (\Delta\Phi_{D1}(T_1))}{\partial T_1} \right] \approx -I_H A_G \left[ \frac{\partial (\Delta\Phi_{D2}(T_2))}{\partial T_2} \right] \quad (21)$$

Figure 11:
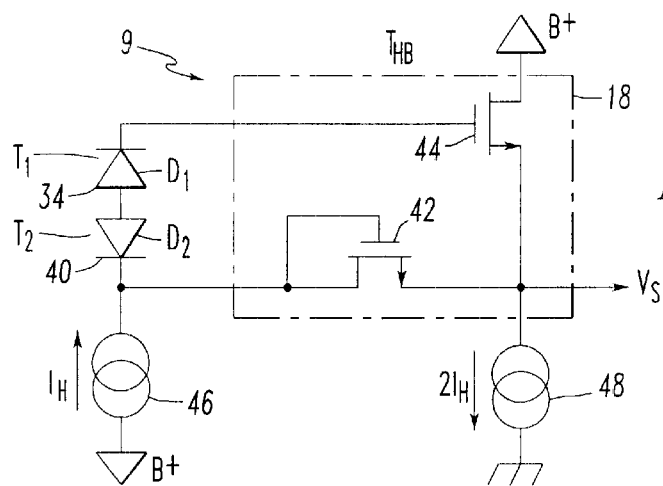
FIG. 11 is a detailed electrical circuit diagram using N-MOSFETS, further illustrative of the amplifier shown in FIG. 9.
Figure 12:
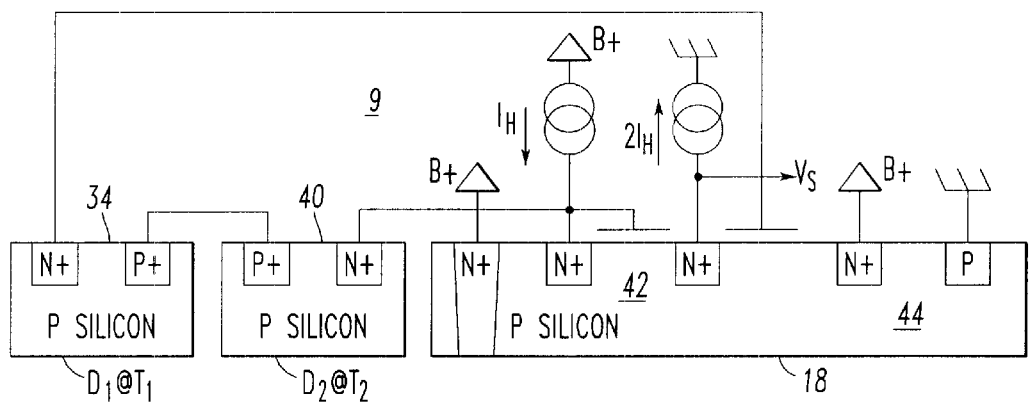
FIG. 12 is a diagram illustrative of the semi-conductor structure using N-MOSFETS for implementing the electro-thermal feedback circuit shown in FIG. 11.
Figure 13:
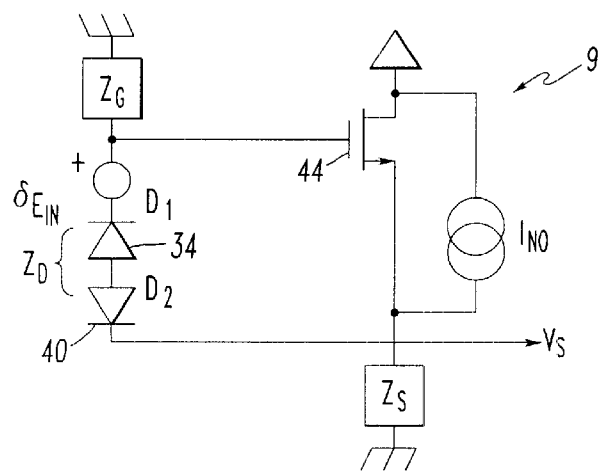
FIG. 13 is a functional equivalent circuit of the electro-thermal feedback shown in FIG. 11 used for analysis.

The value of the electro-thermal coefficient A is readily computed and we begin by computing the gain $A_G$ of the USSS pixel circuit 9 shown in FIGS. 11 and 12 where the amplifier 18 is implemented by a pair of MOSFETs 42 and 44. The gain is computed by analyzing the equivalent circuit shown in FIG. 13 and obtaining an expression for the output voltage $V_S$ in terms of the input voltage $\delta E_{IN}=\partial[\Delta\Phi_{D1}(T_1)]/\partial T_1$, the thermal voltage across the diodes 34 and 40. The input voltage $\delta E_{IN}$, the gate voltage $V_G$ and the output voltage $V_S$ are related by:

$$V_G = \frac{(V_S + \delta E_{IN}) Z_G}{Z_G + Z_D} \quad (22)$$

A second equation relating $V_G$ and $V_S$ is obtained by summing currents at the output node $V_S$, and after some rearrangements, we obtain:

$$V_G = \left[ \frac{(Z_S + Z_D + Z_G)}{g_m Z_G (Z_G + Z_D)} + 1 \right] V_S \quad (23)$$

The gain is obtained by combining Equations 22 and 23 to remove $V_G$ and obtain an explicit relationship for the gain, and is given by:

$$A_G = \frac{V_S}{\delta E_{IN}} = \frac{\frac{Z_G}{Z_D + Z_G}}{\left(1 - \frac{Z_G}{Z_D + Z_G}\right) + \frac{Z_S + Z_D + Z_G}{g_m Z_S (Z_G + Z_D)}} \quad (24)$$

Equation 24 is readily simplified for the condition where $Z_G>>\{Z_D,Z_S\}$, and the gain $A_G \approx g_m Z_S$. It should be evident that the input impedance of the gain transistor 44 in FIG. 11 should be as large as possible and this translates into a MOSFET. The impedance of the current generators, 46 and 48 represented by $Z_S$ in FIG. 13 needs to be very large and this achievable with Wilson type current generators. Also, because of space limitations, special single stage transistors 42 and 44 can be designed to provide very high output impedance. The expected voltage gain is given by $A_G/(1+j\omega/\omega_0)$ with $\omega_0 \approx 2\times 10^5$ rad/sec. For $\partial[\Delta\Phi_{D2}(T_2)]/\partial T_2 \approx -2$ mV/K, $A_G \approx 10^4$ and $I_H \approx 2$ μA, the value of the thermal electrical coefficient $A \approx 4\times 10^{-5}/(1+j\omega/\omega_0)$ W/K. It is important for the electro-thermal coefficient to be large relative to the conductances $G_1^*$ and $G_2^*$, about $10^{-7}$ W/K. This requirement becomes evident by examining the operation of the electro-thermal feedback amplifier and heater.

The electro-thermal feedback circuit as shown in FIG. 9 incorporates the amplifier 18 into the thermally isolated intermediate stage 16. Accordingly, the power consumed by the amplifier 18 performs the function of a heater. This functional equivalence is illustrated in FIGS. 11 and 12, where the electro-thermal amplifier's circuit diagram and physical layout are shown, respectively.

There are two current sources 46 and 48 incorporated into the circuit shown in FIG. 11. The current arrangement forces the same dc current through each MOSFET 42 and 44. Accordingly, the gate to source voltage drop will be the same for the matched pair. With the arrangement shown, the gate to source threshold voltages are cancelled, including any temperature induced variation in the FET threshold voltage. Thus the amplifier amplifies the net voltage difference between diodes 34 and 40. Utilizing an MOSFET amplifier insures that the thermally induced Fermi energy offsets are not attenuated. The semiconductor structure shown in FIG. 12 further insures that all interconnect thermal contact potential cancels. The performance of the USSS is optimized with these cancellations. The photoresponse improvements in the USSS due to electro-thermal feedback will now be analyzed.

USSS Array

Figure 14:
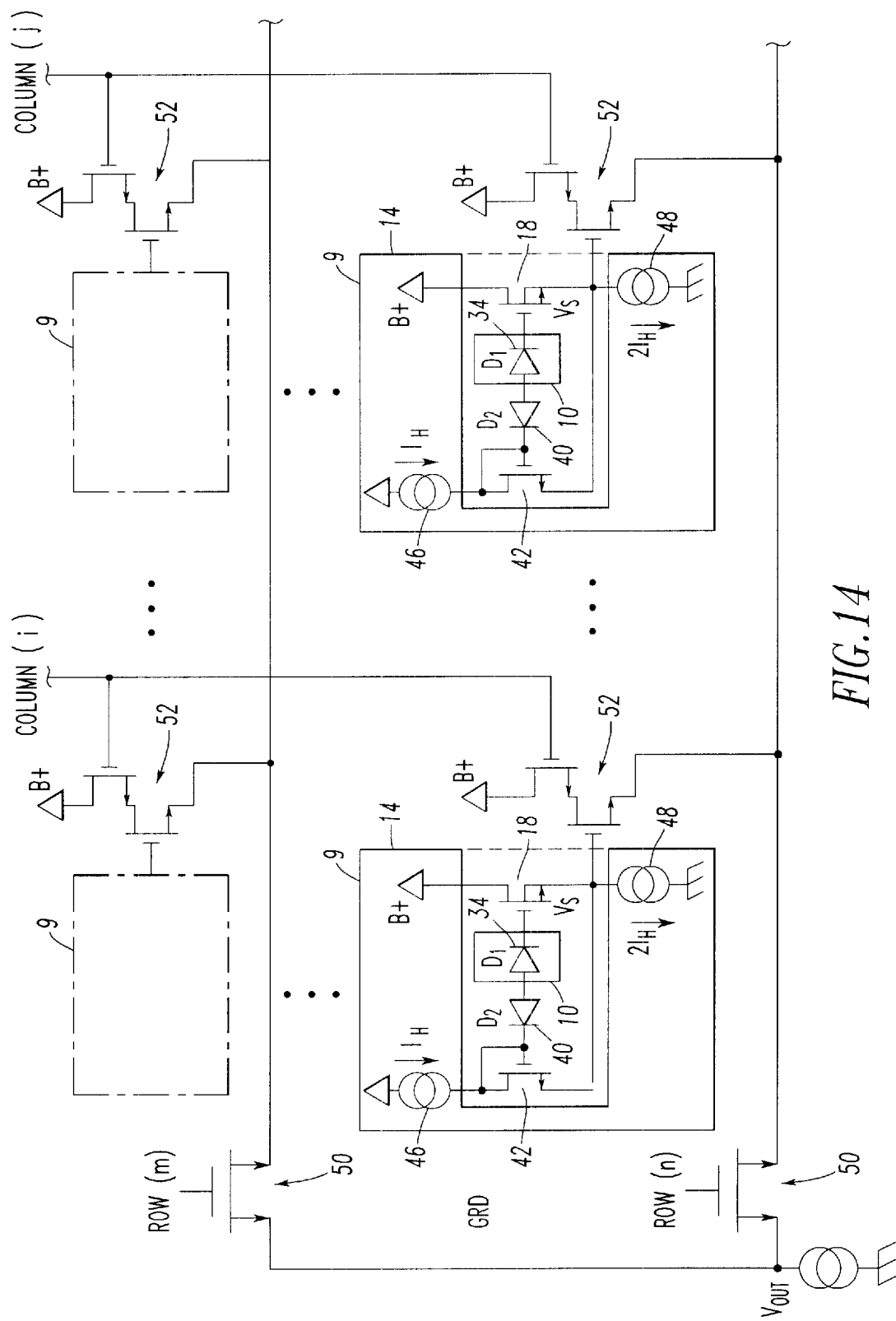
FIG. 14 is an electrical circuit diagram of an array of pixels shown in FIG. 11.

The USSS pixels 9 shown in FIG. 11 are intended for incorporation into an array with readout electronics for accessing the output of each individual USSS pixel. An x-y array of USSS pixel cells 9 is shown in FIG. 14 and includes x-y address switches 50 and 52 for accessing each USSS pixel 9. Conventional address circuits, column and row shift registers utilized with such apparatus are not shown. Such a USSS array is capable of imaging the electromagnetic radiation emanating from the scene. This includes passive or active radiation in the IR and/or millimeter wavelengths.

Photo Response In USSS

Figure 15:
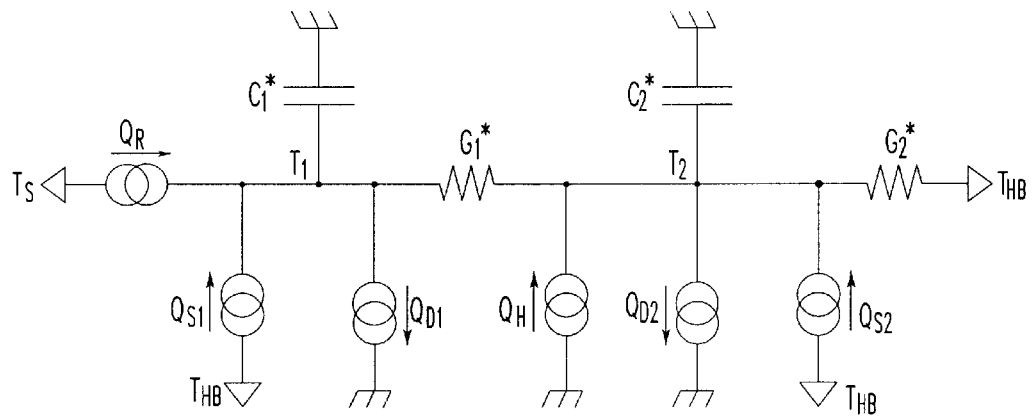
FIG. 15 is a thermal equivalent circuit of the circuitry shown in FIG. 5.

The photoresponse of the USSS configuration shown in FIG. 5 is computed from an analysis on a thermal equivalent circuit shown in FIG. 15. In FIG. 15, the heat capacity of the absorber element 10 is represented by $C_1^*$ and the intermediate stage 16 heat capacity is represented by $C_2^*$. $Q_R$ represents the radiative power from the scene absorbed by the absorber element 10. $Q_{S1}$ and $Q_{S2}$ represent the radiative power from the radiation shields absorbed by the absorber element 10 and intermediate stage 16. $Q_{D1}$ and $Q_{D2}$ represent the radiative power emitted by the absorber element 10 and the intermediate stage 16. $Q_H$ is the power delivered by the electro-thermal feedback circuit to the intermediate stage 16.

The analysis follows an approach similar to the analysis presented for a conventional bolometer. The analysis implicitly assumes that by design $T_{HB}$ is always less than $T_1$ and $T_2$. The analysis demonstrates that electro-thermal feedback severely attenuates the conductance of $G_1^*$, thereby leading to a ten-fold improvement in thermal isolation and photoresponse.

The thermal balance conditions at the absorber element 10 and intermediate stage 16 are expressed in terms of two integral differential equations. At the absorber element 10, the equation for thermal balance is given by:

$$Q_R - Q_{DI} + Q_{SI} = -\int_{T_1}^{T_2} G_1(T) dT + \int_{T_1}^{T_1+\delta T_1} j\omega C_1(T) dT \quad (25)$$

$$= \sum_{n=0}^{\infty} \left( -\frac{\partial'' G_1(T)}{\partial T''}\bigg|_{T_1} \frac{(T_2 - T_1)^n}{(n+1)!} + j\omega \frac{\partial'' C_1(T)}{\partial T''}\bigg|_{T_1} \frac{(\delta T_1)^n}{(n+1)!} \right)$$

For small temperature dependence in $G_1(T)$ and $C_1(T)$, the integrals in Equation 25 can be approximated by the first two terms of the Taylor series. Using this approximation, and taking the temperature differential of Equation 25, we obtain a simplified expression given by:

$$G_R \delta T_S = [G_1^* + G_{D1} + j\omega C_1^*]\delta T_1 - G_1^* \delta T_2 \quad (26)$$

Where, as before, we define $G_1^* = G_1 + (T_2 - T_1)\partial G_1/\partial T_1$.

Similarly, thermal balance conditions at the intermediate stage 16 give rise to a integral equation given by:

$$-Q_{D2} + Q_H + Q_{S2} = -\int_{T_2}^{T_{HB}} G_2(T) dT +$$

$$\int_{T_2}^{T_2+\delta T_2} j\omega C_2(T) dT + \int_{T_1}^{T_2} G_1(T) dT$$

$$= \sum_{n=0}^{\infty} \left[ \left( -\frac{\partial^n G_2(T)}{\partial T^n}\bigg|_{T_2} \frac{(T_{HB} - T_2)^{n+1}}{(n+1)!} + j\omega \frac{\partial^n C_2(T)}{\partial T^n}\bigg|_{T_2} \frac{(\delta T_2)^{n+1}}{(n+1)!} \right) \right] +$$

$$\sum_{n=0}^{\infty} \left[ \frac{\partial^n G_1(T)}{\partial T^n}\bigg|_{T_1} \frac{(T_2 - T_1)^{n+1}}{(n+1)!} \right]$$

As in Equation 25, for $G_1(T)$ and $C_1(T)$ with a small temperature dependence, the integral is approximated by the first two Taylor series terms. Taking the temperature differential of Equation 27 and combining with Equations 20 and 21, we obtain a simplified expression and it is given by:

$$[G_1^* + A]\delta T_1 = [G_1^* + G_2^* + G_{D2} + A + j\omega C_2^*]\delta T_2 \quad (28)$$

with the new variable $G_2^*$ defined as: $G_2^* = G_2 + (T_{HB} - T_2)\partial G_2/\partial T_2$. Since $A >> \{G_1^*, G_2^*, G_{D2}\}$, it should be evident from Equation 28 that the electro-thermal feedback forces $\delta T_1 \approx \delta T_2$. Under such conditions the thermal current through $G_1^*$ is not changed even though the bolometer's temperature $T_1$ changes. Since the temperature of the intermediate stage $T_2$ tracks changes in the bolometer's temperature, the effect is to make $G_1^*$ seem like a much smaller thermal conductance, and should approach a value less the radiative limit $G_R$ as A goes to infinity. The improvement in USSS pixel responsivity is demonstrated below.

Improving the effective thermal isolation, by electro-thermal feedback, is further revealed by combining equations 26 and 28 and eliminating $T_2$. Solving Equation 28 for $T_2$ in terms of $T_1$ and substituting into Equation 26, to eliminate $T_2$, we obtain, after some rearrangements, an expression for $T_1$ as a function of $T_S$, specifically:

$$\delta T_1 = \frac{G_R}{\left[G_{DI} + j\omega C_1^* + \frac{G_1^*[G_2^* + G_{D2} + j\omega C_2^*]}{[G_1^* + G_2^* + G_{D2} + A + j\omega C_2^*]}\right]} \delta T_S \quad (29)$$

$$\cong \frac{\left[\frac{G_R}{G_{DI}}\right]}{\left[1 + \frac{j\omega C_1^*}{G_{DI}}\right]} \delta T_S$$

Equation 29 reveals that for large electro-thermal feedback values, $A >> \{G_1^*, G_2^*, G_{D2}\}$, the change in scene temperature $\delta T_S$ is related to $\delta T_1$ by an approximation represented by the right side of Equation 29. For the values used here, $A \approx 4 \times 10^{-5}/(1+\omega/\omega_0)$W/K (see Equation 21) and this is much larger than the typical values of $G_1^* \cdot G_2^* \approx 2 \times 10^{-7}$W/K. Therefore, actions of the thermal electrical feedback reduces conductance $G_1^* \approx 40 \, G_{D1}$, at least 40 fold, below the conductance $G_{D1}$. This reduction decreases the size of the denominator thereby leading directly to a 40 fold improvement in photoresponse, as evident from comparing the factors in Equations 3 and 29. The improved photoresponse is evident from the change in the absorber element's temperature $\delta T_1$ in response to a change in scene temperature $\delta T_S$ (see Equation 29) and this is simply equal to: $\delta T_1/\delta T_S = 1/(4F^2)$. The increased photoresponsivity reduces the noise suceptability from the readout circuit, directly leading to an improved NEΔT.

The ac response of the absorber element 10, given by the approximation in Equation 29, is a function of the time constant $C_1^*/G_{D1}$. For TV frame rates, this requires the heat capacity of the bolometer be minimized, and this can be accomplished by reducing the density of the absorber element 10 through use of porous structures. Such structures will provide good optical absorption and good mechanical stability. Additionally, the use of concentrators, made with an antenna (FIG. 6) or lens (FIG. 8) will reduce the absorber element and minimize the time constant.

With the interrelationships between $\delta T_1$, $\delta T_2$, and $\delta T_S$, given by Equations 28 and 29, we proceed to compute the USSS photoresponse. The power $Q_H$, delivered by the electro-thermal feedback circuit, also provides the output signal $V_S$. Changes in the power $\delta Q_H$ delivered by the electro-thermal feedback circuit is very simply related to the output signal $\delta V_S$ by the bias current $I_H$, and a sign change:

$\delta Q_H = -\delta V_S I_H$. Incorporating this relationship into Equation 27, and after some rearrangement, we obtain an expression for the output signal dependence on $\delta T_1$, $\delta T_2$, and it is given as:

$$\delta V_S I_H = G_1^* \delta T_1 - [G_1^* + G_2^* + G_{D2} + j\omega C_2] \delta T_2 \qquad (30)$$

For responsivity, this Equation needs to be expressed in terms of $\delta T_S$. First, by using Equation 28, we replace $\delta T_2$ by $\delta T_1$, and this is followed by replacing $\delta T_1$ by $\delta T_S$, using Equation 29. Performing all these substitutions, and after some rearrangements, the USSS's responsivity is given by:

$$\frac{\delta V_S(\omega)}{\delta T_S(\omega)} = \frac{-A \frac{G_R}{I_H}}{\left[1 + \frac{(G_1^* + A)}{(G_2^* + G_{D2} + j\omega C_2)}\right](G_{D1} + j\omega C_1) + G_1^*} \qquad (31)$$

$$\cong -\left(\frac{G_2^* + G_{D2}}{I_H}\right)\left(\frac{G_R}{G_{DI}}\right) \frac{\left[1 + j\omega \frac{C_2}{G_2^* + G_{D2}}\right]}{\left[1 + j\omega \frac{C_1}{G_{DI}}\right]} \text{ Volts/Kelvin}$$

The approximations for Equation 31 are obtained by insuring that $A >> \{G_1^*, G_2^*, G_{D2}\}$, where $A = A_G/[1 + j\omega/\omega_0]$ Equation 21). Under these approximations, the computed dc responsivity is about $(0.25/F^2)(G_2^*/I_H) \approx 0.025$ V/K: when $I_H = 2$ μA, $G_{D1}/G_R = 4F^2 = 0.25$ and $G_2^* \approx 2 \times 10^{-7}$ W/K. Thus, by having made $A_0$ very large, the absorber element's dc response is greatly increased and produces a signal sufficiently large to detect and overcome the readout noise.

There are two ac time constants, the first one is from the absorber element 10 and is given as $C_1/G_{D1}$, and the second is for the intermediate stage 16 and it is given by $C_2/(G_2^* + G_{D1})$. For television frame rates, we require the bolometer time constant to be consistent with 30 $H_z$ frame rate, or $C_1/G_{D1} = 1/(60\pi)$. The USSS performance, in terms of NEΔT temperature sensitivity, requires computation of the noise levels and these are analyzed below.

Noise Level In USSS

Aside for noise term due to the electronic feedback power $Q_H$, the noise sources in the USSS and conventional bolometers stem from the same sources. Specifically, the noise sources are from: thermal fluctuations in the scene's flux, $Q_S$, thermal fluctuations in the radiation shields, $Q_{S1}$ and $Q_{S2}$, thermal fluctuations from the heat bath coupled through conductance $G_1^*$ and $G_2^*$, and thermal fluctuations induced by radiation from the absorber element, $Q_{D1}$, and the intermediate stage, $Q_{D2}$. These noise sources manifest themselves by inducing temperature fluctuations in the absorber element's temperature, corrupting the signal. Since the USSS output is a voltage signal $V_S$, the noise produced by the aforementioned thermal fluctuation will itemized and given in terms of a voltage noise components.

Noise at the USSS output includes contributions from several sources. The RMS noise fluctuations appear as voltage fluctuations, produced by temperature fluctuations in: (1) the scene, $\delta V_S(T_S)$, (2) the heat bath, $\delta V_S(T_{HB})$, (3) the absorber's $T_1$ temperature stage, $\delta V_S(T_1)$, and (4) the intermediate $T_2$ temperature stage, $\delta V_S(T_2)$. Additionally, a fifth term is the electronic noise in the USSS readout circuits also produce an RMS noise voltage, $\delta V_S(E_L)$, at the output. Each one of these noise components is derived and given for the USSS below.

In computing the noise, we know the RMS fluctuations for: the scene $T_S$, the heat bath temperature $T_{HB}$, the absorber's $T_1$ temperature stage, the intermediate $T_2$ temperature stage, and the readout electronics. Each of these RMS values represents the standard deviation in the Fourier representation for the fluctuations present in the different signal sources. By computing the USSB transfer function for each frequency and integrating all these different frequency contributions, we obtain an expression based on the original RMS fluctuation in each signal.

(1) Spectral fluctuations in the scene temperature, $\delta T_S(\omega)$, generates noise in the USSS readout circuit $\delta V_S(T_S(\omega))$, and this is given by Equation 31. Since we integrate contributions over a wide frequency range, the spectral content at higher frequencies makes the most contributions. Thus Equation 31 is approximated at higher frequencies by:

$$\delta V_S(T_S(\omega)) \cong \frac{-(G_2^* + G_{D2})}{[G_{DI} + j\omega C_1^*]} \left[\frac{G_R}{I_H}\right] \delta T_S(\omega) \qquad (32)$$

Where we have assumed that most of the contributions are from the low frequencies where the gain of the absorber element 10 is the highest. The higher frequencies are attenuated and thus the approximation of Equation 32 from Equation 31. The RMS voltage noise due to the spectral temperature fluctuations in the scene temperature $T_S(\omega)$ is:

$$\delta V_S(T_S) \cong \left[\frac{G_2^* + G_{D2}}{I_H}\right]\left[\frac{1}{2\pi}\int_0^\infty \left|\frac{-1}{[G_{DI} + j\omega C_1^*]}\right|^2 4kT_S^2 G_R \, d\omega\right]^{1/2} \qquad (33)$$

$$\cong \left[\frac{G_2^* + G_{D2}}{I_H}\right]\left(\frac{G_R}{G_{DI}}\right)^{1/2}\left(\frac{kT_S^2}{C_1^*}\right)^{1/2}$$

This is a reasonably good approximation for the noise in the USSS due to fluctuations in the scene temperature $T_S$. For the approximations used to obtain Equation 33, the RMS noise represents an upper bound due to the scene's temperature fluctuations.

(2) Next we proceed to calculate the noise contributions due to the fluctuations in the heat bath temperature $T_{HB}$ on the absorber element's temperature $T_1$ and the intermediate stage temperature $T_2$. Calculating the noise due to these sources requires taking the differentials of Equation 25 and 27 under the conditions that $\delta T_{HB} \neq 0$ and $\delta T_S = 0$. Taking the differential of Equation 25, and after rearranging to simplify, we obtain:

$$[G_{S1} + j\omega C_{HB}]\delta T_{HB}(\omega) + [G_1^*]\delta T_2(\omega) = [G_1^* + G_{D1} + j\omega C_1^*]\delta T_1(\omega) \quad (34)$$

Repeating the same procedure for Equation 27, we obtain a second equation for the interrelation between the noise terms, and it is given by:

$$[G_2^* + G_{S2} + j\omega C_{HB}]\delta T_{HB}(\omega) + [G_1^* + A]\delta T_1(\omega) = [G_1^* + G_2^* + G_{D2} + A + J\omega C_2^*]\delta T_2(\omega) \quad (35)$$

From Equations 19 and 20, we recognize that we can express $\delta Q_H = -I_H \delta V_S = A[\delta T_1 - \delta T_2]$. For the condition where $\delta T_{HB}$ is the source of temperature fluctuations, we can express $\delta T_{HB}$ in terms of $\delta T_1$, and $\delta T_2$, by using Equations 34 and 35. Performing such an rearrangement, we express the spectral variations in the output voltage due to $\delta T_{HB}(\omega)$ as:

$$\delta V_S(\omega) = \qquad (36)$$

-continued $$\frac{A}{I_H}\left[\frac{\frac{(G_{D1}+j\omega C_1^*)(G_2^*+G_{S2}+j\omega C_{HB})}{(G_2^*+G_{D2}+j\omega C_2^*)}-(G_{S1}+j\omega C_{HB})}{\frac{(G_1^*+A)(G_{D1}+j\omega C_1^*)}{(G_2^*+G_{D2}+j\omega C_2^*)}+(G_1^*+G_{D1}+j\omega C_1^*)}\right]\delta T_{HB}(\omega)$$

This equation can be simplified if we include the approximation that $G_{S2} \approx G_{S1}$, $G_{D2} \approx G_{D1} = G_{S2} - G_{S1}$, and $C_2^* \approx C_1^*$. Performing these approximations, we obtain a simplified expression for Equation 36 and it is given by:

$$\delta V_S(\omega) = \frac{G_2^*+G_{D2}}{I_H}\frac{-Aj\omega C_{HB}\delta T_{HB}(\omega)}{[(G_1^*+A)(G_{D1}+j\omega C_1^*)+ (G_2^*+G_{D2}+j\omega C_2^*)(G_1^*+G_{D1}+j\omega C_1^*)]} \quad (37)$$

To compute the RMS noise calculations, we utilize the power spectral density. Converting Equation 37 into a power spectral density expression for the heat bath temperature we obtain:

$$\delta V_S(T_{HB}) \approx \qquad (38)$$

$$\frac{G_2^*+G_{D2}}{I_H}\left[\int_0^\infty \frac{\left(\omega^2 C_{HB}^2\left[\frac{4G_{D1}kT_{HB}^2}{G_{D1}^2+\omega^2 C_{HB}^2}\right]\right)}{\left|(G_{D1}+j\omega C_1^*)+\frac{(G_2^*+G_{D2}+j\omega C_2^*)(G_1^*+G_{D1}+j\omega C_1^*)}{A}\right|^2}\frac{d\omega}{2\pi}\right]^{1/2}$$

Equation 38 can be simplified by recognizing several conditions. The ratio $G_{D1}/C_{HB}$ is very small, leading to cancellation of the $\omega^2 C_{HB}^2$ terms in the denominator and numerator. Additionally, since $A \gg G_1^* + G_2^* + G_{D2}$, we cancel the numerator and denominator terms containing A. After performing all these simplifications and including the fact that $(A+G_1^*+G_2^*+G_{D2})C_1 \gg G_{D1}C_2$, Equation 38 can be simplified to:

$$\delta V_S(T_{HB}) \cong \frac{G_2^*+G_{D2}}{I_H}\left[\frac{kT_{HB}^2}{C_1^*}\right]^{1/2} \quad (39)$$

Figure 16:
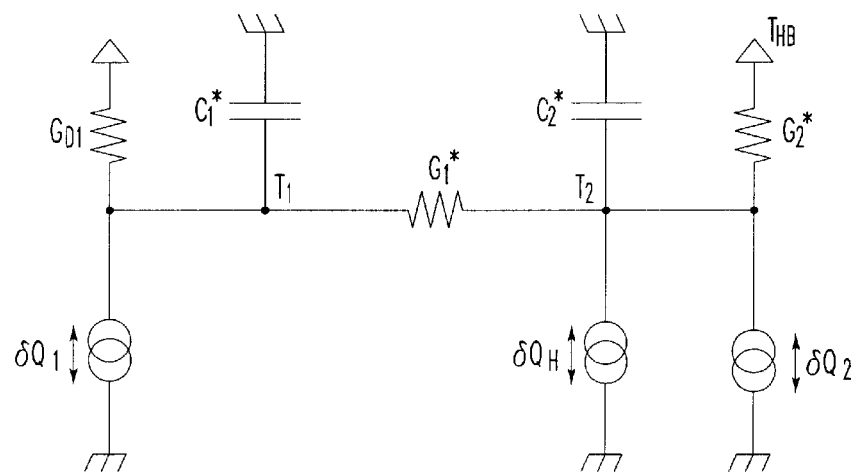
FIG. 16 is a thermal equivalent circuit for the noise sources due to thermal fluctuations in the bolometer amplifier circuitry shown in FIG. 5.

(3) The noise due to fluctuations in the absorber element's temperature $T_1$, also increases the fluctuations in the output voltage. Using the equivalent circuit in FIG. 16, we sum the power at node $T_1$, when $\delta Q_2 = \delta Q_H = 0$, and obtain the following expression:

$$\delta Q_1(\omega) = (G_1^* + G_{D1} + j\omega C_1^*)\delta T_1(\omega) - G_1^*\delta T_2(\omega) \quad (40)$$

Using Equation 28, we eliminate the variable $\delta T_2$ from Equation 40 and obtain the following expression:

$$\delta Q_1(\omega) = \left[G_{D1}+j\omega C_1^* + \frac{G_1^*(G_2^*+G_{D2}+j\omega C_2^*)}{(G_1^*+G_2^*+G_{D2}+A+j\omega C_2^*)}\right]\delta T_1(\omega) \quad (41)$$

From previous computations with Equation 20, we obtain an expression for the noise voltage produced by temperature fluctuations in $T_1$, and it is given by:

$$-\delta V_S[T_1(\omega)]I_H = \qquad (42)$$

$$A\left[1-\frac{\delta T_2}{\delta T_1}\right]\delta T_1 = A\left[\frac{G_2^*+G_{D2}+j\omega C_2^*}{G_1^*+G_2^*+G_{D2}+A+j\omega C_2^*}\right]\delta T_1(\omega)$$

Combining Equation 42 with Equation 41, we obtain an analytical solution for the spectral noise dependence due to fluctuations in the power $\delta Q_1$, and it is given by:

$$-\delta V_S[T_1(\omega)]I_H = \frac{A\delta Q_1(\omega)}{\left[1+\frac{(1+A)}{(G_2^*+G_{D2}+j\omega C_2^*)}\right](G_{D1}+j\omega C_1^*)+G_1^*} \quad (43)$$

The power spectral density square of $\delta Q_1$ is given as $d^2Q_1/df = 4G_{D1}k(T_1)^2$, and combining this with the absolute square of Equation 43, integrating and taking the square root we obtain the RMS voltage fluctuations in $\delta V_S(T_1)$, produced by $T_1$. Performing these operations, with some simplifications, we obtain:

$$\delta V_S(T_1) = \frac{G_2^*+G_{D2}}{I_H}\left[\frac{kT_1}{C_1^*}\right]^{1/2} \quad (44)$$

(4) Contributions from noise fluctuations in $\delta T_2(\omega)$ to the output signal are calculated similarly to contributions from $\delta T_1(\omega)$. Using the equivalent circuit in FIG. 16, we sum the power at node $T_1$, when $\delta Q_1 = \delta Q_H = 0$, and obtain a relationship between $\delta T_1(\omega)$ and $\delta T_2(\omega)$ given by:

$$\delta T_1(\omega) = \left[\frac{G_1^*}{(G_1^*+G_{D2}+j\omega C_1^*)}\right]\delta T_2(\omega) \quad (45)$$

Since we are calculating the effect of noise source $\delta Q_2$, the temperature fluctuations $\delta T_2(\omega)$ in Equation 45 shows that $|T_2| > |T_1|$. Summing the power at node $T_2$ in FIG. 9, we obtain a spectral power relationship given by:

$$\delta Q_2(\omega) + \delta Q_H(\omega) = [G_1^* + G_2^* + G_{D2} + j\omega C_2^*]\delta T_2(\omega) - G_1^*\delta T_1(\omega) \quad (46)$$

Using the fact that $\delta Q_H = A[\delta T_1 - \delta T_2]$, and Equation 45, we eliminate variables $\delta Q_H$ and $\delta T_1$ in Equation 46 and combine with Equation 45 to obtain:

$$\delta Q_2(\omega) = \left[(G_2^*+G_{D2}+j\omega C_2^*) + \frac{(A+G_1^*)(G_{D1}+j\omega C_1^*)}{(G_1^*+G_{D1}+j\omega C_1^*)}\right]\delta T_2(\omega) \quad (47)$$

Using Equation 20, we obtain an expression for the spectral fluctuations in the output voltage $V_S[T_2(\omega)]$ produced by thermal fluctuations at node $T_2$ and it is given by:

$$-\delta V_S[T_2(\omega)]I_H = A\left[1-\frac{\delta T_1}{\delta T_2}\right]\delta T_2 \quad (48)$$

$$= -A\left[\frac{G_{DI} + j\omega C_1^*}{G_1^* + G_{DI} + j\omega C_1^*}\right]\delta T_2(\omega)$$

Combining Equations 47 and 48, to eliminate $\delta T_2(\omega)$, we obtain an expression for the spectral voltage fluctuations at node $T_2$ in terms of the spectral fluctuations in the black body radiation and this is given by:

$$-\delta V_S[T_2(\omega)]I_H = \frac{\delta Q_2(\omega)}{\left[1 + \frac{G_1^*}{A} + \frac{(G_2^* + G_{D2} + j\omega C_2^*)(G_1^* + G_{DI} + j\omega C_1^*)}{A(G_{DI} + j\omega C_1^*)}\right]} \quad (49)$$

Since A is very large, Equation 49 reveals that the power associated with the spectral voltage fluctuations equals the power fluctuations in the black body radiation regardless of the electro-thermal feedback loop. The power fluctuations at node $T_2$ correspond to the classical temperature variance at $T_2$ times the thermal conductivity from this node. Thus the RMS in voltage $V_S$, due to the thermal fluctuations at node $T_2$, is given as:

$$\delta V_S[T_2] = \frac{G_2^* + G_{D2}}{I_H}\left[\frac{kT_2^2}{C_2^*}\right]^{1/2} \quad (50)$$

With Equation 50, we complete calculating all the RMS contributions to the output voltage $V_S$ produced by temperature fluctuations in $T_{HB}$, $T_S$, $T_1$ and $T_2$. The remaining noise contribution is the from the electro-thermal feedback circuit and this is computed below.

(5) The noise from the R/O and electro-thermal feedback circuit will corrupt the USSS output signal. The level of corruption is computed with the aid of the equivalent circuit shown in FIG. 13. All the electrical noise terms have been included into the current generator labeled $I_{N0}$. This represents the noise present without feedback. Additionally, the analysis is based on the fact that the noise in the circuit can be represented in terms of a Fourier series representation with coefficients $I_{N0}$. Doing the analysis for an arbitrary frequency with amplitude $I_{N0}$, provides us with the expression for the noise with electro-thermal feedback.

The noise flowing in the circuit is affected by the electrical and thermal feedback present in the circuit shown in FIG. 11. Thus the current noise level without any feedback, $I_{N0}$, is modified to a new value $I_N$ when feedback is included and it is given by:

$$I_{N0}(\omega) + g_m[V_G(\omega) - V_S(\omega)] = I_N(\omega) \quad (51)$$

where the MOSFET 44 has a transconductance given by $g_m$. In fact the voltage difference between gate and source not only is affected by the flowing noise current, but by the changes across two diodes 34 and 40, which depend on the difference in temperatures between the bolometer and intermediate stage (FIGS. 10 and 11). Designating the voltage change due to electro-thermal effect as $\delta V_D$, the gate to source voltage across the MOSFET in FIG. 11 is given by:

$$V_G(\omega) - V_S(\omega) = -V_S(\omega)\left(\frac{Z_D}{Z_D + Z_G}\right) + \delta V_D(\omega)\left(\frac{Z_G}{Z_D + Z_G}\right) \quad (52)$$

Thus Equation 52 includes the effects of electrical (first term on right) and thermal (second term on right) feedback.

The source voltage produced by the noise current flowing with electro-thermal feedback included $I_N$ is given as:

$$V_S(\omega) = \left(\frac{(Z_D + Z_G)Z_S}{Z_D + Z_G + Z_S}\right)I_N(\omega) \quad (53)$$

Combining Equations 51, 52, and 53, and after some rearrangement, the expression for the noise current $I_N$ in terms of the initial current $I_{N0}$, with no feedback, is given as:

$$I_{N0}(\omega) = I_N(\omega)\left[1 + \frac{g_m Z_D Z_S}{(Z_D + Z_G + Z_S)}\right] - \delta V_D(\omega)\frac{g_m Z_G}{(Z_D + Z_G)} \quad (54)$$

Establishing the relative amplitude relationship between the noise current $I_N$ and the original noise current $I_{N0}$ requires an explicit expression for $\delta V_D$, see Equation 54, in terms of $I_N$. The electro-thermal feedback term $\delta V_D$ is expected to further reduce the noise current, and this is analytically determined below.

From Equation 20, the value of $\delta V_D$ is given in terms of the temperature differentials $\delta T_1$, and $\delta T_2$ as:

$$\delta V_D(\omega) \approx \left(\frac{\partial E_F}{\partial T}\right)(\delta T_1(\omega) - \delta T_2(\omega)) \quad (55)$$

Expressing $\delta V_D$ in terms of the noise current $I_N$ is achieved in several steps. First, using Equation 27, the differential expression can be obtained for the effect of the noise fluctuations on the temperatures of the absorber element's and the intermediate stages. Taking the differential of Equation 27, and recognizing that $\delta Q_{S2} = 0$, we obtain:

$$(G_{D2} + G_2^* + G_1^* + j\omega C_2^*)\delta T_2(\omega) = G_1^*\delta T_1(\omega) + \delta Q_H(\omega) \quad (56)$$

This Equation contains two temperature differentials and the heater power differential. Solving this Equation requires explicit expression for the heater power differential and relationship between the temperature differentials.

The expression for the differential power delivered by the electro-thermal feedback circuit when noise current $I_N$ is flowing is given by:

$$\delta Q_H(\omega) = -\delta V_S[E_L(\omega)]I_N(\omega) = -I_N(\omega)\left[\frac{Z_S(Z_G + Z_D)}{Z_S + Z_G + Z_D}\right]I_H \quad (57)$$

The differential power is given as a product of three factors with a negative sign. The product of the first two terms in Equation 57 equals to the differential voltage developed in response to the noise current $I_N$, and when this product is multiplied by the dc current $I_H$, the differential power is obtained. The negative sign indicates that as the current $I_H$ increases, the power delivered by the electro-thermal feedback circuit decreases, see Equation 19.

The relationship between the temperature differentials in Equation 56 is obtained by using Equation 25, when $Q_R$ and $\delta Q_{S1}$ are equal to zero. Taking the differential of Equation 25 under these conditions, we obtain a relationship between $\delta T_1$, and $\delta T_2$, given by:

$$\delta T_1(\omega) = \left[\frac{G_1^*}{G_1^* + G_{DI} + j\omega C_1^*}\right]\delta T_2(\omega) \quad (58)$$

Combining Equations 56 and 58, to eliminate $\delta T_1$, and after some rearrangement, the expression for the differential power delivered by the electro-thermal feedback circuit becomes:

$$\delta Q_H(\omega) = \left[ G_2^* + G_{D2} + j\omega C_2^* + \frac{G_1^*(G_{DI} + j\omega C_1^*)}{G_1^* + G_{DI} + j\omega C_1^*} \right] \delta T_2(\omega) \quad (59)$$

Similarly, Equation 55 can be expressed entirely in terms $\delta T_2$, after eliminating $\delta T_1$ by using Equation 58. Performing these substitutions, the new expression for $\delta V_D$ becomes:

$$\delta V_D(\omega) = -\left[ \frac{G_{DI} + j\omega C_1^*}{G_1^* + G_{DI} + j\omega C_1^*} \right] \frac{\partial E_F(t)}{\partial T} \delta T_2(\omega) \quad (60)$$

Combining Equations 59 and 60, to eliminate $\delta T_2$, an equation is obtained for the voltage change $\delta V_D$ across the two diodes in terms of differential noise power and is given as:

$$\delta V_D(\omega) = \left[ \frac{\delta Q_H(\omega)}{(G_2^* + G_{D2} + j\omega C_2^*) + \frac{G_1^*(G_{DI} + j\omega C_1^*)}{G_1^* + G_{DI} + j\omega C_1^*}} \right] \left[ \frac{(G_{DI} + j\omega C_1^*)}{G_1^* + G_{DI} + j\omega C_1^*} \right] \frac{\partial E_F(T)}{\partial T} \quad (61)$$

Utilizing Equation 57, where $\delta Q_H$ is expressed in terms of the noise current $I_N$, Equation 61 is recast to relate $\delta V_D$ to the noise current and is given as:

$$\delta V_D(\omega) = \left[ \frac{I_H Z_S (Z_G + Z_D)}{Z_S + Z_G + Z_D} \right] \quad (62)$$

$$\left[ \frac{I_N(\omega) \frac{\partial E_F(T)}{\partial T}}{\frac{(G_2^* + G_{D2} + j\omega C_2^*)(G_1^* + G_{DI} + j\omega C_1^*)}{(G_{DI} + j\omega C_1^*)} + G_1^*} \right]$$

Finally, after all these computations, we have an expression for $\delta V_D$ in terms of the noise current $I_N$, including the effect of thermal and electrical feedbacks. Thus, substituting Equation 62 into 54, provides the circuit noise current $I_N$ in terms of the circuit noise current $I_{N0}$, without feedback, and this is given by:

$$I_N(\omega) = \frac{I_{N0}(\omega)}{1 + \frac{g_m Z_S Z_D}{(Z_S + Z_G + Z_D)} - \left[ \frac{\left[\frac{g_m Z_S Z_G}{Z_S + Z_G + Z_D}\right] I_H \frac{\partial E_F(T)}{\partial T}}{\frac{(G_2^* + G_{D2} + j\omega C_2^*)(G_1^* + G_{DI} + j\omega C_1^*)}{(G_{DI} + j\omega C_1^*)} + G_1^*} \right]} \quad (63)$$

Equation 63 reveals that the electrical (first algebraic term in denominator) and thermal (second algebraic term in the denominator) feedback terms attenuate the electronic noise currents. In Equation 63, all the denominator terms are positive, the negative sign in front of the thermal feedback term is cancelled by the negative sign of $\partial E_F(T)/\partial T \approx -2$ mV/K. The noise attenuation produced by the electrical and thermal feedbacks is readily estimated for operating real operating conditions. Typically, $Z_G >> \{Z_D, Z_S\}$, $g_m Z_S >> 1 G_2^* \approx G_1^* > \{10 G_{D1}, 10 G_{D2}\}$ and by incorporating these conditions into Equation 63, a simplified expression is obtained and given by:

$$I_N(\omega) \cong \frac{I_{N0}(\omega)}{1 - \left[ \frac{(G_{DI} + j\omega C_1^*) g_m Z_S I_H \frac{\partial E_F(T)}{\partial T}}{(G_2^* + G_{D2} + j\omega C_2^*)(G_1^* + G_{DI} + j\omega C_1^*)} \right]} \quad (64)$$

It should be evident that the thermal feedback term is dominating the noise reduction. For $I_H = 2 \mu A$, $\partial E_F(T)/\partial T \approx -2$ mV/K, $\{G_{D1}, G_{D2}\} \approx 1.5 \times 10^{-8}$ W/K, $g_m Z_S \approx 10^4$, and $\{G_1^*, G_2^*\} \approx 2 \times 10^{-7}$ W/K, the thermal term dominates and is about $4 \times 10^{-5}$ W/K. Thus the utilization of electro-thermal feedback in addition to increasing the signal (compare Equations 3, 18, and 29) about ten fold but also reduces the readout noise by about ten. The spectral voltage amplitude produced by the noise currents in the readout circuit is obtained by combining Equations 63 and 57 to yield:

$$\delta V_S[E_L(\omega)] \cong \frac{I_{N0}(\omega) Z_S}{1 + \left[ \frac{-g_m Z_S I_H \frac{\partial E_F(T)}{\partial T}}{\frac{(G_2^* + G_{D2} + j\omega C_2^*)(G_1^* + G_{DI} + j\omega C_1^*)}{(G_{DI} + j\omega C_1^*)}} \right]} \quad (65)$$

The spectral noise density for the readout circuit is readily simplified by recognizing that $A = -I_H g_m Z_S \partial E_F(T)/\partial T$ (see Equation 21) Incorporating these into Equation 65, we obtain a much simpler expression given by:

$$\delta V_S[E_L(\omega)] \cong I_{N0}(\omega) Z_S \left[ \frac{G_2 G_1}{A G_{DI}} \right] \quad (66)$$

It should be evident that for large electro-thermal feedback $(A >> \{G_2, G_1^*, \text{ and } G_{D1}\}$ the noise is attenuated. The spectral noise density is readily converted into a standard deviation by intergrating over frequency, or if 1/f noise is neglected, multiplying by the square root of the electrical bandwidth, $(\Delta_{BW})^{1/2}$, and this is given by:

$$\delta V_S(E_L) \leq I_{N0}(\omega) Z_S \left[ \frac{G_2 G_1}{A G_{DI}} \right] \Delta_{BW}^{1/2} \quad (67)$$

Total Noise Voltage At USSS

The total noise at the bolometer's output is the RMS sum of the results given in Equations 33, 39, 44, 50 and 67. Combining all these Equations, the expression for the total RMS noise voltage at the bolometer's output is given by:

$$\delta V_S(\text{RMS}) \leq \quad (68)$$

$$\frac{G_2^* + G_{D2}}{I_H} \left[ \left( \frac{G_R}{G_{DI}} \right) \left( \frac{kT_S^2}{C_1^*} \right) + \left( \frac{kT_{HB}^2}{C_1^*} \right) + \left( \frac{kT_1^2}{C_1^*} \right) + \left( \frac{kT_2^2}{C_2^*} \right) + \left( I_{N0}(\omega) Z_S \frac{G_2^* G_1^*}{G_{DI} A} \frac{I_H}{G_2^* + G_{D2}} \right)^2 \Delta_{BW} \right]^{1/2}$$

The expression for the total RMS voltage noise includes contributions from: the scene, the heat bath, the bolometer stage $T_1$, the intermediate stage $T_2$, and the readout electronics. Several things are evident from this Equations. The signal from the scene (see Equation 31) is enhanced by the use of electro-thermal feedback. However, the noise in the scene signal (represented by the first term in the square brackets in Equation 68) is attenuated by $G_R/G_{D1}$. This difference occurs because the signal is within frequency response of the electro-thermal feedback circuit, while the broad band noise is not. The second term in the square brackets represents the noise from the heat bath, and can be reduced by making $T_{HB}$ less than $T_S$. The third term in the square brackets represents the noise from the absorber element and the fourth term represent the noise term from the intermediate stage. The noise from the intermediate stage can be minimized by making $C_1^* \ll C_2^*$, while the thermal electrical feedback insures that $T_1 \approx T_2$. The last term represents the electronic readout noise. For best performance, the electronic noise should be less than the most significant term in the square brackets in Equation 68, given by $(kT_S^2/C_1^*)$, that is approximately equal to $(kT_{HB}^2/C_1^*)$, since $T_{HB} \approx T_S$. The value of this term can be readily estimated by recognizing that $T_S \approx 300K$. The bolometer's heat capacity $C_1^*$ is estimated to be equal $C_1^* \cong 1.5 \times 10^{-10}$ J/K, corresponding to the heat capacity of a 30 µm by 30 µm membrane 0.01 µm thick, and $k=1.38 \times 10^{-23}$ J/K. Combining all these terms, the value calculated for $(kT_S^2/C_1^*) \cong 8.3 \times 10^{-9}$ K$^2$. For best sensitivity, the value of the electronic readout noise, fifth term in the square brackets of Equation 68, $[(I_H/(G_2^*+G_{D2}))(I_{N0}Z_S)((G_2^*G_1^*)/AG_{D1})]^2 \Delta_{BW}$, should be less than the minimum value of thermal noise. The minimum value of the thermal noise is about twice $(kT_S^2/C_1^*)$ or about $1.7 \times 10^{-8}$ K$^2$. Including the explicit formula for $A=-I_H g_m Z_S \partial E_F(T)/\partial T$ (see Equation 21), the electronic noise term in Equation 68 yield after some simplifications an expression given by $[(I_{N0}/g_m)(G_1/G_{D1})(1/(\partial E_F(T)/\partial T))]^2 \Delta_{BW} < 1.7 \times 10^{-8}$ K$^2$. The white noise term square can be approximated as $I_{N0} \approx (2/3)4 kTg_m$, the thermal conductance ratio $(G_1^*/G_{D1}) \approx 10$ and $\partial E_F(T)/\partial T \approx 0.002V$, giving a simplified expression for the required transconductance as $1.6 \times 10^{-5} \Delta^{1/2}_{BW} < g_m$. Selecting a 30 Hz bandwidth yields a value of $g_m > 8.7 \times 10^{-5}$, or about 2 µA current though the MOSFET. With these constraints, it is evident that the readout circuit noise will be about equal the bolometer's theoretical thermal fluctuation noise, about 0.13 mK. Since we are interested in performance of about 10 mK, larger noise can be tolerated with the USSS and still provide an NE$\Delta$T sensitivity better than 10 mK.

Similar to Equation 13, the NE$\Delta T_{USSS}$ of Ultra-sensitive Silicon Sensor represents the minimum temperature the USSS pixel can resolve and occurs at unity signals to noise ratio. This ratio is calculated by taking the RMS fluctuation in the USSS pixel's noise voltage, given by Equation 68, and dividing it by the absolute value of Equation 31. At unity signal to noise ratio, solving for $\delta T_S$, the equation obtained for NE$\Delta T_{USSS}$, after including several approximations, is given by:

$$NE\Delta T_{USSB} \geq \left(\frac{G_{DI}}{G_R}\right) \left(\frac{kT_S^2}{C_1^*}\right)^{1/2} \begin{bmatrix} \left(\frac{G_R}{G_{DI}}\right) + \left(\frac{T_{HB}}{T_S}\right)^2 + \left(\frac{T_1}{T_S}\right)^2 + \\ \left(\frac{T_2}{T_S}\right)^2 \left(\frac{C_1^*}{C_2^*}\right) + \\ \left(\frac{C_1^*}{kT_S^2}\right)\left(I_{N0}(\omega)Z_S \frac{G_1}{G_{DI}A}I_H\right)^2 \Delta_{BW} \end{bmatrix}^{1/2} \left[\frac{1+\left(\frac{\omega C_1^*}{G_{DI}}\right)^2}{1+\left(\frac{\omega C_2^*}{G_2^*+G_{D2}}\right)^2}\right]^{1/2} \quad (69)$$

Equation 69 includes ac and dc factors. The dc sensitivity is represented as the product of the first three factors in Equation 69. The ac dependence is represented by the last factor in Equation 69. Optimization of the dc and ac factors for best sensitivity is considered below.

The dc NE$\Delta T_{USSS}$ is made up of three factors: (1) the first factor is the attenuation due to thermal conductivity ratio $G_{D1}/G_R = 4F^2$, (2) second factor is the theoretical thermal dynamic sensitivity limit $(kT_S^2/C_1^*)^{1/2}$, (3) and the third factor is the relative fractional contributions of the different noise sources present, see large square brackets in Equation 69. With use of electro-thermal feedback, the first factor is minimized and for optics with F#=1, $G_{D1}/G_R=4$. The second factor $(kT_S^2/C_1^*) \approx 10^{-8}$, where $C_1^*$ is the heat capacity of the absorber element 10, and estimated to equal the capacity of a 30 µm by 30 µm membrane 0.01 µm thick: $C_1^* \cong 1.5 \times 10^{-10}$ J/K. The terms in the large square brackets are arranged in three rows: the first row contains the radiation term and is equal to 0.25; the second row contains three terms representing the heat bath $(T_{HB}/T_S)^2$, the absorber element $(T_1/T_S)^2$, and the intermediate stage $(T_2/T_S)^2(C_1^*/C_2^*)$; the last row includes the relative amplitude of the electronic's noise. With proper design, the largest term in the second row is from the intermediate stage $(T_1/T_S) \approx (T_{HB}/T_S)^2$ and it should be about unity. The contributions from the readout electronic's noise can be minimized relative to the absorber elements 10 contribution. This is made possible by adjusting all the factors of $(C_1^*/kT_S^2)[I_H(\omega)(I_{N0}Z_S)(G_1/AG_{D1})]^2 \Delta_{BW} < 2$, and this condition was satisfied in the previous section when $g_m > 8.7 \times 10^{-5}$. Using such a value for $g_m$, noise equivalent temperature of the USSS (NE$\Delta T_{USSS}$) is readily computed to be 0.7 mK. This is excellent performance and would be reduced if we include 1/f noise terms. It is anticipated that the noise degradations (including 1/f noise) will reduce the NE$\Delta T_{USSS}$ to about 10 mK.

The ac response of the USSS is represented by the frequency dependent factors in Equation 69. The numerator has a radial frequency corner given by $G_{D1}/C_1^*$, while the denominator has a radial frequency corner given by $(G_2^*+G_{D2})/C_2^*$. Typically $G_2^* > 100G_{D1}$ and $C_2^* > C_1^*$, therefore the numerator corner frequency dominates. The representative number for the numerator's corner frequency is $G_{D1}/C_1^* \approx 5 \times 10^{-9}/1.5 \times 10^{-10} = 33$ Rad/sec. This is slow and needs to be increased by increasing $G_{D1}$ or decreasing $C_1^*$. This can be achieved with a lens or antenna design. The USSS offers improved performance compared to conventional bolometer sensors.

USSS Pixel Spectral Response

The spectral response of the USSS pixel is adjustable. The broadest response is possible with the configuration shown in FIG. 5. The alternate embodiments of the USSS pixel 9 shown with the antenna (FIG. 6) and lens (FIG. 8) can be tuned to operate over different spectral bands. These include mid-wave IR, Long-wave IR and millimeter waves (94 GHz, 220 GHz), for example. The spectral response band is tunable by the antenna configuration and the spectral response of the lens and substrate.

Having thus shown and described what is at present considered to be preferred embodiments of USSS pixel invention, it should be noted that all modifications, changes and alterations coming within the spirit and scope of invention as set forth in the appended claims are also meant to be included.

What is claimed is:

1. An electromagnetic radiation sensor assembly, comprising:
   means for providing a heat bath; a thermally responsive absorber element for detecting radiant electromagnetic energy; an intermediate stage for thermally isolating the absorber element from the means for providing a heat bath, and including first and second thermal isolation member, each having a predetermined thermal conductance, interconnecting the absorber element to the intermediate stage and the intermediate stage to the heat bath, the first thermal isolation member being located between the absorber element and the intermediate stage and the second thermal isolation member being located between the intermediate stage and the means for providing a heat bath;

an electro-thermal feedback circuit incorporated into the intermediate stage for reducing the thermal conductivity between the absorber element and the means providing a heat bath by causing the temperature of the intermediate stage to converge to the temperature of the absorber element when detecting radiation, effectively causing the thermal conductance of the first thermal isolation member to attain a minimum conductance value and thereby improve the sensitivity of the radiation sensor towards the radiation limit; and wherein the electro-thermal feedback circuit includes a heat generating amplifier integrated with the intermediate stage and means for detecting the temperature difference between the absorber element and the intermediate stage and generating a temperature difference signal for controlling the amplifier and the heat generated thereby, and wherein the heat generated by the amplifier itself directly heats the intermediate stage in response to said temperature difference signal so as to equalize the temperature between the absorber element and the intermediate stage.

2. A sensor assembly according to claim 1 wherein the intermediate stage includes an intermediate structure.

3. A sensor assembly according to claim 2 wherein said means for providing a heat bath, said absorber element and said intermediate stage form a single pixel.

4. A sensor assembly according to claim 3 and additionally including an antenna element in the intermediate stage for channeling incident radiation to the absorber element.

5. A sensor assembly according to claim 3 wherein said means for providing a heat bath includes a lens element for channeling incident radiation to the absorber element.

6. A sensor assembly according to claim 3 and additionally including an antenna element or a lens element for channeling incident radiation to the absorber element within each pixel.

7. A sensor assembly according to claim 6 wherein the spectral response of at least one of the elements including the absorber element, the antenna element, and the lens element is adjusted to operate in a predetermined region of the electromagnetic spectrum.

8. A sensor assembly according to claim 7 wherein said predetermined region includes the long wavelength infra red (LWIR) and medium wavelength infra red (MWIR) spectral regions.

9. A sensor assembly according to claim 7 wherein said predetermined region includes the region of 96 GHz and 220 GHz.

10. A sensor assembly according to claim 7 wherein said predetermined region includes at least two different spectral bands of said spectrum.

11. A sensor assembly according to claim 3 wherein said absorber element comprises a bolometer.

12. A sensor assembly according to claim 3 wherein said pixel is fabricated in silicon.

13. A sensor assembly according to claim 3 wherein a plurality of said pixels are included in an array of pixels.

14. A sensor assembly according to claim 11 wherein said intermediate stage includes a support member and, wherein said support member and said isolation members form a bridge for positioning the bolometer above the means providing a heat bath.

15. A sensor assembly according to claim 14 wherein said means for providing a heat bath includes a substrate.

16. A sensor assembly according to claim 2 wherein said amplifier comprises a differential amplifier and wherein the means for detecting the temperature difference includes first and second diodes for respectively sensing the temperature difference between the absorber element and the intermediate stage.

17. A sensor assembly according to claim 16 wherein the first and second diodes are connected in back-to-back circuit relationship and to the amplifier inputs.

18. A sensor assembly according to claim 2 wherein said sensor assembly comprises a three-tier device wherein said absorber element includes an upper portion facing a source of electromagnetic radiation and a lower portion located adjacent the intermediate stage.

19. A sensor assembly according to claim 18 wherein said intermediate stage includes a centralized opening therein and wherein the lower portion of the absorber element is located substantially co-planar with said intermediate stage in the said opening.

20. A sensor assembly according to claim 2 wherein said sensor assembly comprises a two-tier device wherein said absorber element and said intermediate stage comprises substantially co-planar elements located above the means for providing a heat bath.

21. A sensor assembly according to claim 20 wherein said intermediate stage includes a centralized opening therein and wherein said absorber element is located in said opening.

22. A sensor assembly according to claim 21 and additionally including a thermal radiation antenna element located on a front surface of said intermediate stage for acting as a concentrator for channeling incident radiation to the absorber element.

23. A sensor assembly according to claim 22 wherein said antenna element includes a log periodic antenna design for channeling incident radiation to the absorber element.

24. A sensor assembly according to claim 21 and additionally including a lens located in relatively close proximity to the absorber element for acting as a concentrator for funneling incident radiation to the absorber element.

25. A sensor assembly according to claim 24 wherein said lens is incorporated in the substrate so as to funnel incident radiation to the absorber element.

26. An electromagnetic radiation sensor assembly, comprising:

an array of sensor pixels, each of said pixels including, a thermally sensitive absorber element for detecting radiant electromagnetic energy; and an intermediate stage for locating the absorber element above a common heat bath member, said intermediate stage including, an intermediate structure located above the common heat bath member, a first thermal isolation member having a predetermined thermal conductance connecting the absorber element to the intermediate structure, and a second thermal isolation member having a predetermined thermal conductance connecting the intermediate structure to the common heat bath member; and an electro-thermal feedback circuit for reducing the thermal conductivity between the absorber element and the heat bath member by causing the temperature of the intermediate structure to converge to the temperature of the absorber element when detecting electromagnetic radiation, effectively causing the thermal conductance of first the thermal isolation member to attain a minimum conductance value and thereby improve the sensitivity of the sensor element toward the radiation limit;

wherein the electro-thermal feedback circuit includes a heat generating amplifier integrated with the intermediate structure and means for detecting the temperature difference between the absorber element and the intermediate structure and generating a temperature difference signal for controlling the amplifier and the heat generated thereby, and wherein the heat generated by the amplifier itself directly heats the intermediate structure in response to said temperature difference signal so as to converge the temperature of the intermediate structure to the temperature of the absorber element.

27. A sensor assembly according to claim 26 wherein each of said pixels additionally includes a thermal radiation antenna element or a lens element for channeling incident radiation to the absorber element.

28. A sensor assembly according to claim 27 wherein said absorber element comprises a bolometer.

29. A sensor assembly according to claim 28 wherein the spectral response of at least one of the elements including the absorber element, the antenna element, and the lens element is adjusted to operate in a predetermined region of the electromagnetic spectrum.

30. A sensor assembly according to claim 28 wherein said predetermined region includes the long wavelength infra red (LWIR) and medium wavelength infra red (MWIR) spectral regions.

31. A sensor assembly according to claim 29 wherein said predetermined region includes at least two different spectral bands of said spectrum.

32. An electromagnetic radiation sensor assembly, comprising:

heat bath means; heat absorber means for detecting electromagnetic radiation; thermal isolation means located intermediate the heat bath means and the heat absorber means for thermally isolating the heat absorber means from the heat bath means, first means having a predetermined thermal conductance for connecting the heat absorber means to the thermal isolation means, and second means having a predetermined thermal conductance for connecting the thermal isolation means to the heat bath means; and electro-thermal feedback circuit means incorporated into the thermal isolation means for reducing the thermal conductivity between the heat absorber means and the heat bath means by causing the temperature of the thermal isolation means to converge to the temperature of the heat absorber means when detecting electromagnetic radiation, effectively causing the thermal conductance of the first means for connecting to attain a minimum conductance value and thereby improve the sensitivity of the sensor assembly toward the radiation limit;

wherein the electro-thermal feedback circuit means includes heat generating amplifier means integrated with the thermal isolation means and means for detecting the temperature difference between the heat absorber means and the thermal isolation means and generating a temperature difference signal for controlling the amplifier means and the heat generated thereby, and wherein the heat generated by the amplifier means directly heats the thermal isolation means in response to said temperature difference signal so as to equalize the temperature between the heat absorber means and the thermal isolation means.

33. A sensor assembly according to claim 32 wherein said electromagnetic radiation comprises RF radiation.

34. A sensor assembly according to claim 32 wherein said electromagnetic radiation comprises infra red radiation.

35. A sensor assembly according to claim 32 wherein said electromagnetic radiation comprises microwave radiation.

36. A sensor assembly according to claim 32 wherein said electromagnetic radiation comprises millimeter wave radiation.

37. A sensor assembly according to claim 32 wherein said heat absorber means comprises a two-tier or a three-tier sensor assembly.

* * * * *